(12) United States Patent
Horn et al.

(10) Patent No.: US 10,305,776 B2
(45) Date of Patent: May 28, 2019

(54) NETWORK VERIFICATION

(71) Applicant: FUJITSU LIMITED, Kawasaki-shi, Kanagawa (JP)

(72) Inventors: Alexander Horn, Sunnyvale, CA (US); Ali Kheradmand, Urbana, IL (US)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 15/610,590

(22) Filed: May 31, 2017

(65) Prior Publication Data

US 2018/0351845 A1   Dec. 6, 2018

(51) Int. Cl.
*H04L 12/24* (2006.01)
*H04L 12/26* (2006.01)
*H04L 12/741* (2013.01)

(52) U.S. Cl.
CPC ............ *H04L 43/50* (2013.01); *H04L 45/745* (2013.01)

(58) Field of Classification Search
CPC ....... H04L 41/14; H04L 41/147; H04L 43/00; H04L 43/0823; H04L 45/54
See application file for complete search history.

(56) References Cited

U.S. PATENT DOCUMENTS

| | | | |
|---|---|---|---|
| 9,225,601 B2 | 12/2015 | Khurshid et al. | |
| 2005/0278431 A1* | 12/2005 | Goldschmidt | H04L 41/0869 709/207 |
| 2009/0034419 A1* | 2/2009 | Flammer, III | H04L 45/124 370/238 |

OTHER PUBLICATIONS

Kazemian, P., Chan, M., Zeng, H., Varghese, G., McKeown, N., & Whyte, S. (Apr. 2013). Real Time Network Policy Checking Using Header Space Analysis. In NSDI (pp. 99-111).
Yang, H., & Lam, S. S. (2016). Real-time verification of network properties using atomic predicates. IEEE/ACM Transactions on Networking, 24(2), 887-900.
Yuan, L., Mai, J., Su, Z., Chen, H., Chuah, C.-N., and Mohapatra, P. FIREMAN: A toolkit for firewall modeling and analysis. In SP (2006).
Horn, A., Kheradmand, A., & Prasad, M. R. (2017). Delta-net: Real-time Network Verification Using Atoms. arXiv preprint arXiv:1702.07375.
Ball, T., Bjørner et al. VeriCon: Towards verifying controller programs in software-defined networks. In PLDI (2014).

(Continued)

*Primary Examiner* — Scott M Sciacca
(74) *Attorney, Agent, or Firm* — Maschoff Brennan

(57) ABSTRACT

A network verification method may include identifying a data plane for routing traffic through a network that includes one or more forwarding tables for each switch of a plurality of switches in the data plane. The method may also include obtaining a forwarding behavior representation of the data plane based on the forwarding tables, and obtaining a forwarding rule from the one or more forwarding tables. The method may additionally include transforming the forwarding behavior representation based on the forwarding rule. The method may also include pruning meta-information about the forwarding rule that is redundant to forwarding behavior, and comparing the forwarding behavior representation of the data plane to one or more network properties of expected behavior of the data plane to detect one or more errors in the data plane as variations from the expected behavior.

20 Claims, 26 Drawing Sheets

(56) References Cited

OTHER PUBLICATIONS

Beckett, R., Zou, X. K., Zhang, S., Malik, S., Rexford, J., and Walker, D. An assertion language for debugging SDN applications. In HotSDN (2014).

Canini, M. et al. A NICE way to test openflow applications. In NSDI (2012).

Fayaz, S. K, and Sekar, V. Testing stateful and dynamic data planes with FlowTest. In HotSDN (2014).

Fayaz, S. K., Yu, T., Tobioka, Y., Chaki, S., and Sekar, V. Buzz: Testing context-dependent policies in stateful networks. In NSDI (2016).

Stoenescu, R., Popovici, M., Negreanu, L., and Raiciu, C. SymNet: Scalable symbolic execution for modern networks. In SIGCOMM (2016).

Velner, Y., Alpernas, K., Panda, A., Rabinovich, A., Sagiv, M., Shenker, S., and Shoham, S. Some complexity results for stateful network verification. In TACAS (2016).

Al-Shaer, E., and Al-Haj, S. FlowChecker: Configuration analysis and verification of federated OpenFlow infrastructures. In SafeConfig (2010).

Al-Shaer, E., Marrero, W., El-Atawy, A., and El-Badawi, K. Network configuration in a box: towards end-to-end verification of network reachability and security. In ICNP (2009).

Bjørner, N., Juniwal, G., Mahajan, R., Seshia, S. A., and Varghese, G. ddNF: An efficient data structure for header spaces. Tech. rep., Microsoft Research, 2015.

Fogel, A., Fung, S., Pedrosa, L., Walraed-Sullivan, M., Govindan, R., Mahajan, R., and Millstein, T. A general approach to network configuration analysis. In NSDI (2015).

Gember-Jacobson, A., Viswanathan, R., Akella, A., and Mahajan, R. Fast control plane analysis using an abstract representation. In SIGCOMM (2016).

Jayaraman, K., Bjørner, N., Outhred, G., and Kauf-Man, C. Automated analysis and debugging of network connectivity policies. Tech. rep., Microsoft Research, 2014.

Jeffrey, A., and Samak, T. Model checking firewall policy configurations. In Policy (2009).

Kazemian, P., Chang, M., Zeng, H., Varghese, G., McKeown, N., and Whyte, S. Real time network policy checking using header space analysis. In NSDI (2013).

Kazemian, P., Varghese, G., and McKeown, N. Header space analysis: Static checking for networks. In NSDI (2012).

Khurshid, A., Zou, X., Zhou, W., Caesar, M., and God-Frey, P. B. VeriFlow: Verifying network-wide invariants in real time. In NSDI (2013).

Lopes, N. P., Bjørner, N., Godefroid, P., Jayaraman, K., and Varghese, G. Checking beliefs in dynamic networks. In NSDI (2015).

Mai, H., Khurshid, A., Agarwal, R., Caesar, M., God-Frey, P. B., and King, S. T. Debugging the data plane with Anteater. In SIGCOMM (2011).

Maldonado-Lopez, F. A., Calle, E., and Donoso, Y. Detection and prevention of firewall-rule conflicts on software-defined networking. In RNDM (2015).

Nelson, T., Barratt, C., Dougherty, D. J., Fisler, K., and Krishnamurthi, S. The Margrave tool for firewall analysis. In LISA (2010).

Son, S., Shin, S., Yegneswaran, V., Porras, P. A., and Gu, G. Model checking invariant security properties in Open-Flow. In ICC (2013).

Xie, G. G., Zhanm, J., Maltz, D. A., Zhang, H., Green-Berg, A., Hjalmtysson, G., and Rexford, J. On static reachability analysis of IP networks. In INFOCOM (2005).

Yang, H., and Lam, S. S. Real-time verification of network properties using atomic predicates. In ICNP (2013).

\* cited by examiner

NETWORK VERIFICATION

FIELD

The embodiments discussed herein relate to network verification.

BACKGROUND

A software-defined network (SDN) may include a series of network objects (e.g., switches, routers, firewalls), which may be automated via commercial or open source tools customized according to one or more requirements (e.g., requirements of a network administrator). Network functions virtualization (NFV) includes moving network functions (e.g., functions performed by routers, firewall, load balancers), which are performed by dedicated hardware, into a virtualized environment.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a network verification method. The method may include identifying a data plane for routing traffic through a network that includes one or more forwarding tables for each switch of a plurality of switches in the data plane. The method may also include obtaining a forwarding behavior representation of the data plane based on the forwarding tables, and obtaining a forwarding rule from the one or more forwarding tables. The method may additionally include transforming the forwarding behavior representation based on the forwarding rule. The method may also include pruning meta-information about the forwarding rule that is redundant to forwarding behavior, and comparing the forwarding behavior representation of the data plane to one or more network properties of expected behavior of the data plane to detect one or more errors in the data plane as variations from the expected behavior.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
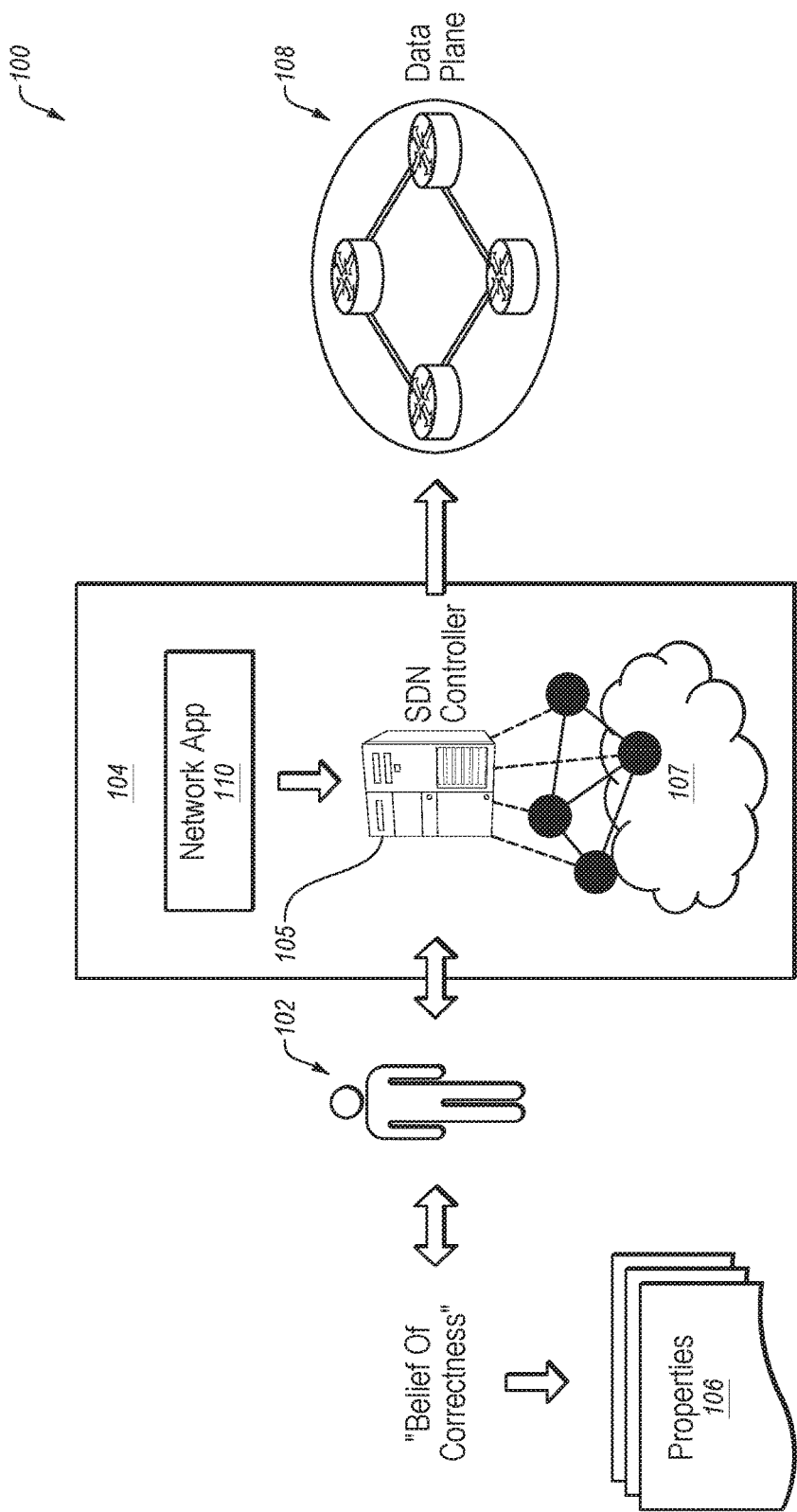
FIG. 1 illustrates an example system that may be used for network verification.

Communication networks may include multiple switches that may route packets of information to different elements of the networks based on forwarding rules that apply to each switch. In some instances, the forwarding rules may correspond to network addresses that may be included in the packets in that certain rules may correspond to certain network addresses that are within a specific address range.

The present disclosure uses a representation of network forwarding rules to perform network verification with respect to the routing of packets within the network. Rather than representing each rule independently, a rule may be represented by one or more half-intervals, referred to as atoms, representing distinct portions of address ranges. The set of all atoms may represent all possible address ranges. Atoms may have a rule that "owns" a particular atom, meaning that the owning rule is the highest priority rule for the range of network addresses of that atom on a given switch in the network. As new rules are introduced or removed, the representation of the forwarding rules may be adjusted or modified by creating any new atoms that are needed based on the address range covered by the rule, and updating or verifying the current ownership information for each atom that covers an address range affected by the rule being added or removed. In these and other embodiments, the representation may be used to perform network verification.

Real-time network verification may automatically detect violations of network-wide reachability invariants on a data plane associated with the network. For example, real-time network verification may detect situations in which a packet may not reach its intended destination because of infinite loops in forwarding rules, physically damaged data links, etc. To be useful in practice, these violations may be detected in the order of milliseconds, without raising false alarms.

As used herein, the term "data plane" may refer to communications and connections used in the transmission and reception of data through the network, and may include the actual physical connections available within the network. As used herein, the term "control plane" may refer to communications and connections used in the control and administration of a network itself, rather than the transmission of data through the network, which may occur at the data plane. For example, the control plane may include administrative traffic directed to a network device within a network, while the data plane may include traffic that passes through network devices within the network.

In an ever-increasing interconnected world, network traffic is increasingly diverse and demanding, ranging from communication between small everyday devices to larges-cale data centers. This diversity has driven the design and rapid adoption of new open networking architectures, built on programmable network switches, which make it possible to separate the control plane from the data plane. This separation opens up interesting avenues for innovation, including rigorous network analysis for detecting network-related bugs. Finding these bugs may automatically pose one or more challenges.

For example, since the control plane is typically a Turing-complete program, the problem of automatically proving the absence of bugs in the control plane is generally undecidable. However, the data plane, which is produced by the control plane, can be automatically analyzed. While the problem of checking reachability properties in the data plane is generally NP-hard, the problem becomes polynomial-time solvable in the restricted, but not uncommon, case where network switches only forward packets by matching Internet protocol (IP) prefixes. This theoretical fact underpins real-time network verification tools that can automatically detect violations of network-wide invariants on the data plane in the order of milliseconds, without raising false alarms.

Figure 8:
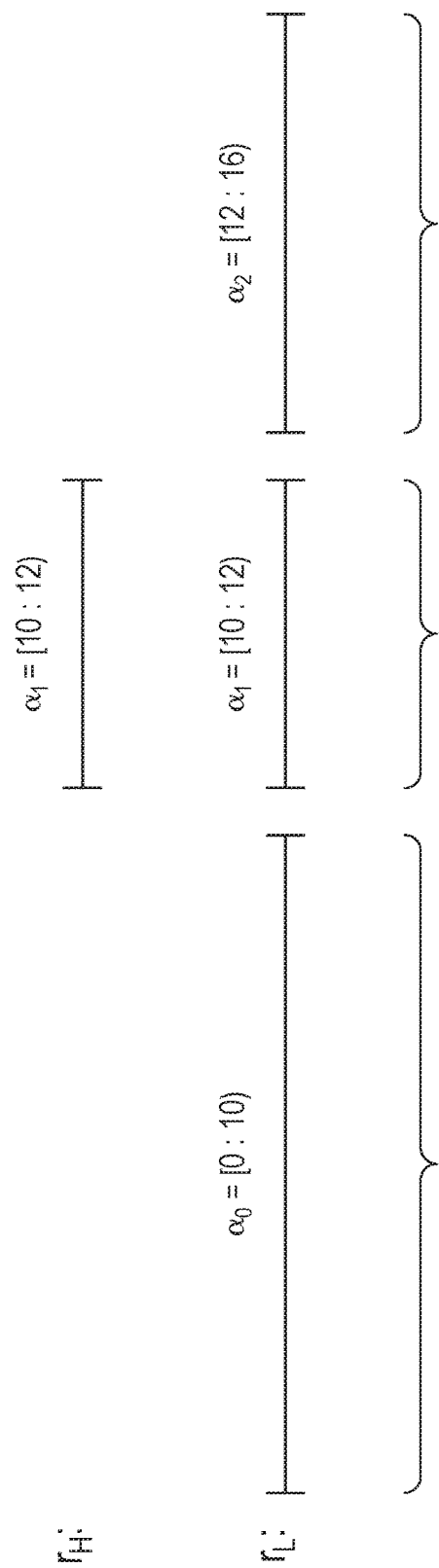
FIG. 8 depicts example atoms for various forwarding rules.
Figure 9:
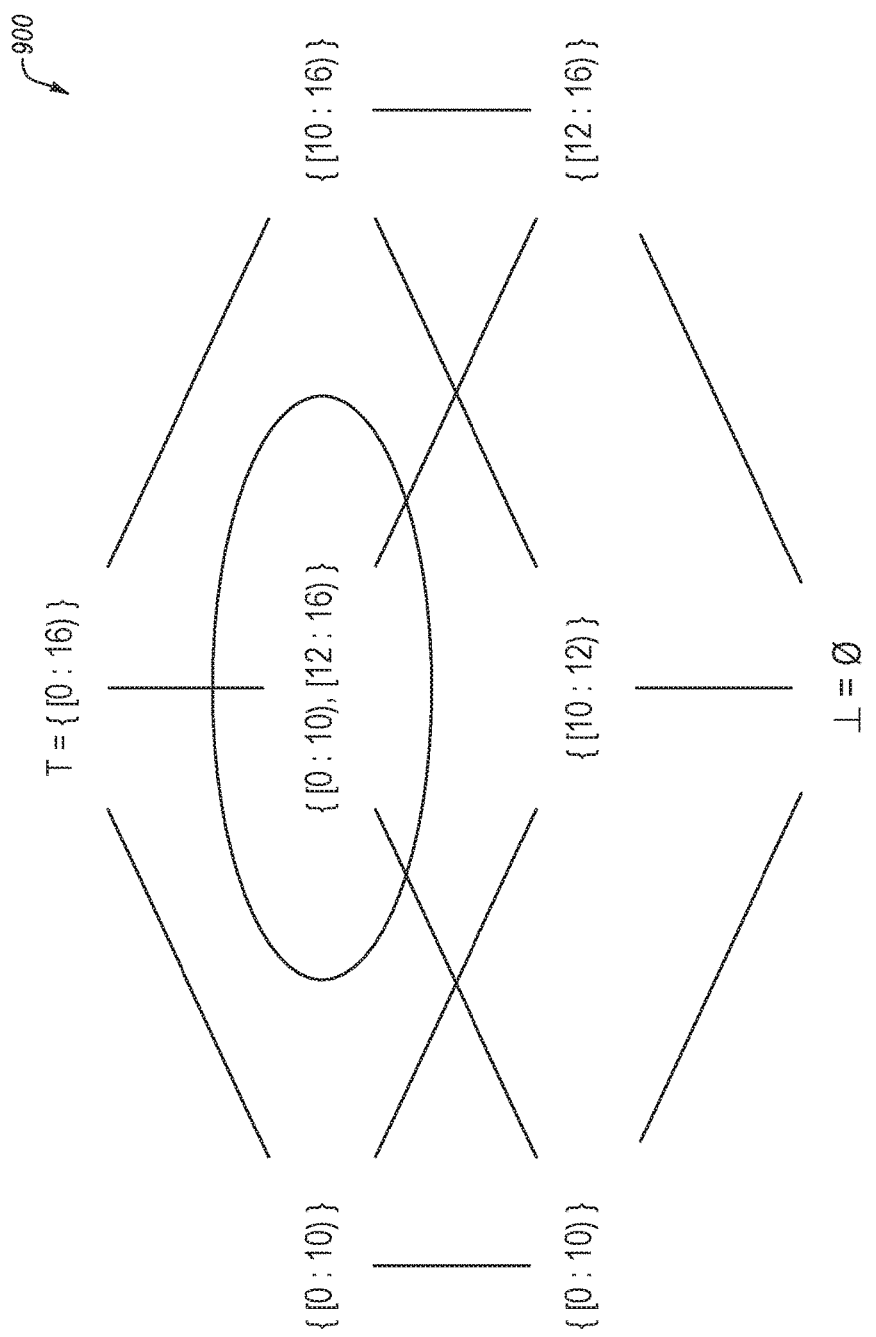
FIG. 9 illustrates an example Hasse diagram.

Conventional systems may perform network verification incrementally, by only checking changes that occur between two data plane snapshots. Specifically, conventional systems exploit two observations, namely: (i) only small parts of the network tend to be affected by typical changes to the data plane; and (ii) there tends to be significant degree of commonality among all forwarding rules in the entire network. For example, a forwarding rule (typically referred to using the variable r in the present disclosure) may indicate for a given network switch where a packet or set of packets should be physically forwarded to. For example, a forwarding rule may indicate that a group of network packets within a range of network addresses identified by an IP prefix are to be routed from a first receiving network switch to a destination network switch. Additionally or alternatively, a forwarding rule may include a priority associated with that rule, such that if two rules for a switch cover the same or overlapping ranges (e.g., as illustrated in FIG. 8), the switch will know which rule to follow when forwarding a packet within the range. An example of a forwarding rule may be described with reference to FIG. 2. To this end, conventional methods include constructing and verifying, from scratch, a set of representations of the forwarding behavior, one for each functional change induced by the data plane change. This leads to inefficiencies in space and computation time for the validation.

Further, conventional systems and methods may verify data and control planes in isolation, and only one data plane is verified at a time. In addition, it is difficult to map detected bugs to specific artifacts in controller code, and control plane verification may miss subtle data plane bugs. Moreover, conventional systems and methods are only semi-automated and may require expertise to prove automated theorems.

Various embodiments of the present disclosure relate to verification of networks, and in particular, to verification of software-defined networks (SDN) or networks employing network function virtualization (NFV). Network verification may be performed in real-time (e.g., on a deployed network), or offline, during development and pre-deployment testing of a network. Network verification may include verifying the correctness of individual snapshots of a network data plane.

As noted above, relatively small parts of a network tend to be affected by typical changes to a data plane, and there tends to be a significant degree of commonality among all forwarding rules in a network. In contrast to conventional systems and methods, various embodiments of the present disclosure may effectively exploit another observation, namely, commonality among flows of packets through parts of a network, rather than its entirety. Such an observation is exploited by using atoms (explained with reference to FIGS. 4A-4C) to represent parts of a network. According to one embodiment, a real-time data plane checker may be configured to address all-pairs reachability queries. Such queries may verify reachability between each pair of switches within a network.

Exploiting this observation, a single compact representation of the forwarding behavior of an entire network may be constructed, wherein the single compact representation may be incrementally and efficiently updated on each data plane change, and thus, changes may be verified more efficiently. Furthermore, in instances where the functional impact of a change may not be localized (e.g., in the case of link or node failures), the representation may also provide significant space efficiencies over conventional methods.

According to various embodiments, as described more fully below, real-time network verification may include automatically refining a lattice-theoretical domain to represent flows of all packets in a network as an edge-labelled graph. A lattice-theoretical domain may include a well-founded approximation or representation of the flow of packets in a network using lattice theory-based elements (e.g., ordered groups). More specifically, instead of constructing multiple forwarding graphs for representing the flow of packets in a network, embodiments of the present disclosure may include transforming a single edge-labelled graph that is a representation of the network forwarding rules. The edge-labelled graph may be transformed by incrementally maintaining the lattice-theory based concept of atoms, which may represent Boolean combinations of forwarding rules in a network. For example, an atom may represent a numerical range of network addresses that are handled the same, for example, all or a portion of an IP prefix. A further explanation of atoms may be included with reference to FIGS. 4A-4C. According to one embodiment, the graph may represent all Boolean combinations of forwarding rules in a network, or in other words, all potential combinations of 0's and 1's (all Boolean combinations) for a numerical representation of IP address ranges may be covered by the atoms. Additionally or alternatively, in some embodiments, the representation may include one or more Patricia trees, for example, the forwarding rules for each node or switch in a network may be represented by a Patricia tree.

Various embodiments of the present disclosure may be backward compatible with known incremental network verification techniques that construct forwarding graphs for the purpose of checking primarily single-source reachability properties. This may preserve a functional characteristics that expertise in formal verification may not be required to check the data plane.

In some embodiments of the present disclosure, one or more elements of the representation may be pruned. For example, rather than storing all information related to rules that may potentially be affecting each atom for a link, a single highest priority rule, which may be referred to as an owner, may be stored for each atom for a given switch in the network. Such ownership information may be part of the meta-information. As used herein, the term meta-information may refer to information stored about a network, rather than data being transmitted through a network.

Embodiments of the present disclosure are now explained with reference to the accompanying drawings.

FIG. 1 illustrates system 100 that may be used in a network verification process. System 100 includes a network administrator 102, a software-defined network (SDN) 104, properties 106, and a data plane 108. SDN 104 may include an SDN controller 105, a physical network 107, which may include data plane 108, and a network application 110.

Properties 106 may include, for example, one or more network-wide invariants, which may be defined by network administrator 102 for reaching one or more goals. For example, the one or more network-wide invariants may include a one or more "reachability invariants." A reachability invariant may include a network destination that may be designed to be always reachable from a first location. Other "invariant" network properties may include any network property that is configured to be reliable, unchanging, or available. For example, with the utilization of other meta-data other invariant network properties may be confirmed or otherwise analyzed. A control plane of the system 100 may include SDN controller 105 and network application 110. A data plane (e.g., data plane 108) of the system 100 may include a snapshot of a configuration of various network switches and/or physical connections in the SDN 104 at a given time. As described above, the control plane may facilitate management and/or control of the SDN 104, and the data plane 108 may facilitate the transmission of customer data through the SDN 104. For example, the solid circles of the physical network 107 may correspond to the switches within the data plane 108. Additionally or alternatively, the data plane 108 may include one or more virtualized network devices.

During operation of a network, an event (e.g., failure events (e.g., node, links), traffic events (e.g., feedback from devices to controller, additional/expiration of connection requests), etc.) may cause the SDN controller 105 to modify data plane 108. For example, a new network switch may be brought up in the physical network 107, or a physical link between two network devices may suffer a mechanical failure. As an additional example, a physical network switch may have a hardware or software failure. As another example, performance on a particular network link between two physical network devices may be analyzed and found to be below a threshold.

Figure 3:
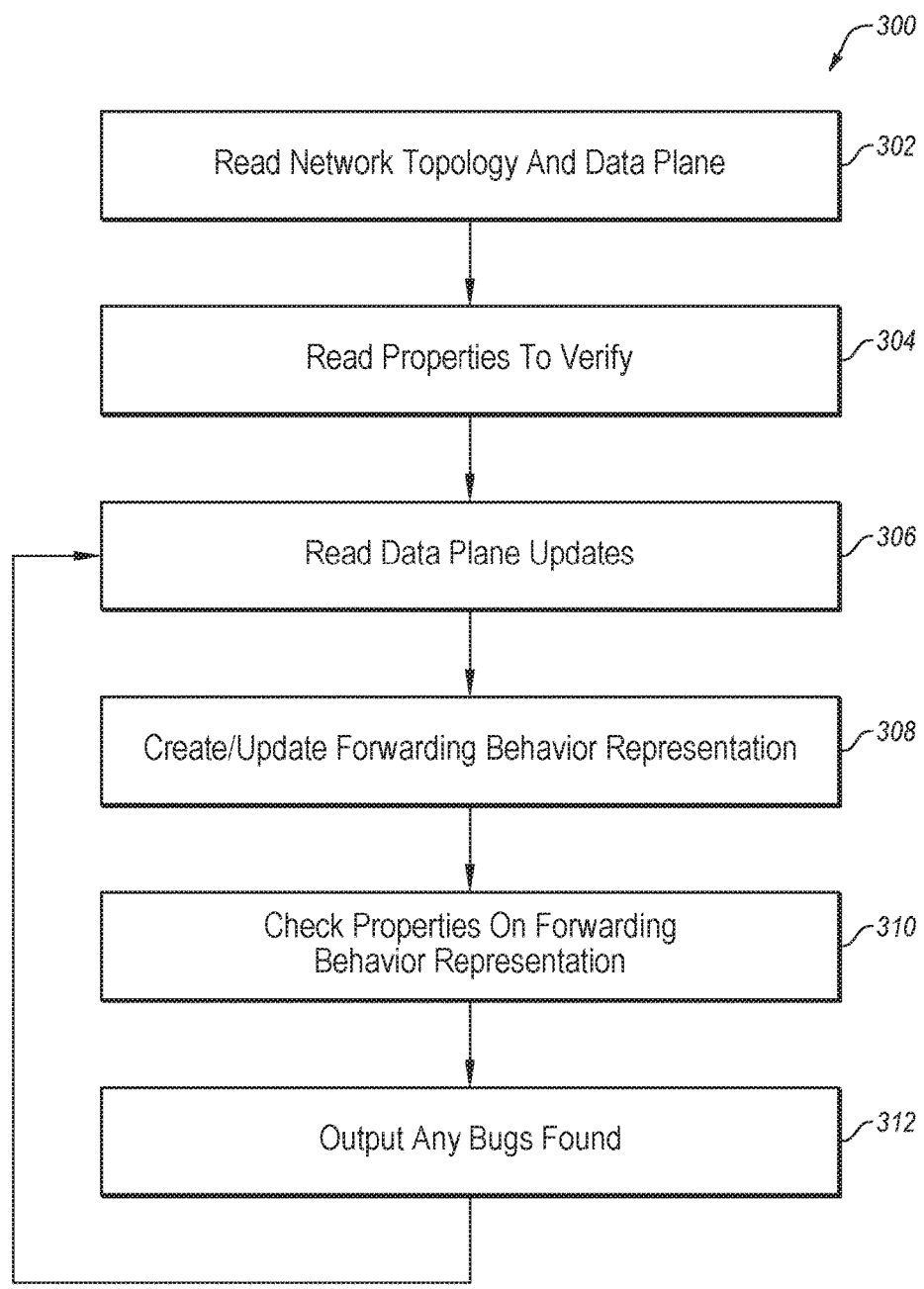
FIG. 3 is a flowchart of an example method for detecting errors in a network.

In some embodiments, the SDN controller 105 may perform network verification (e.g., as described in one or more of FIGS. 3, 6, and/or 10-21). Additionally or alternatively, some other component of the system 100 may perform network verification. The SDN controller 105 may be implemented as an embodiment of the system 2200 of FIG. 22, or as a virtualized machine running on a system such as the system 2200 of FIG. 22.

Figure 2:
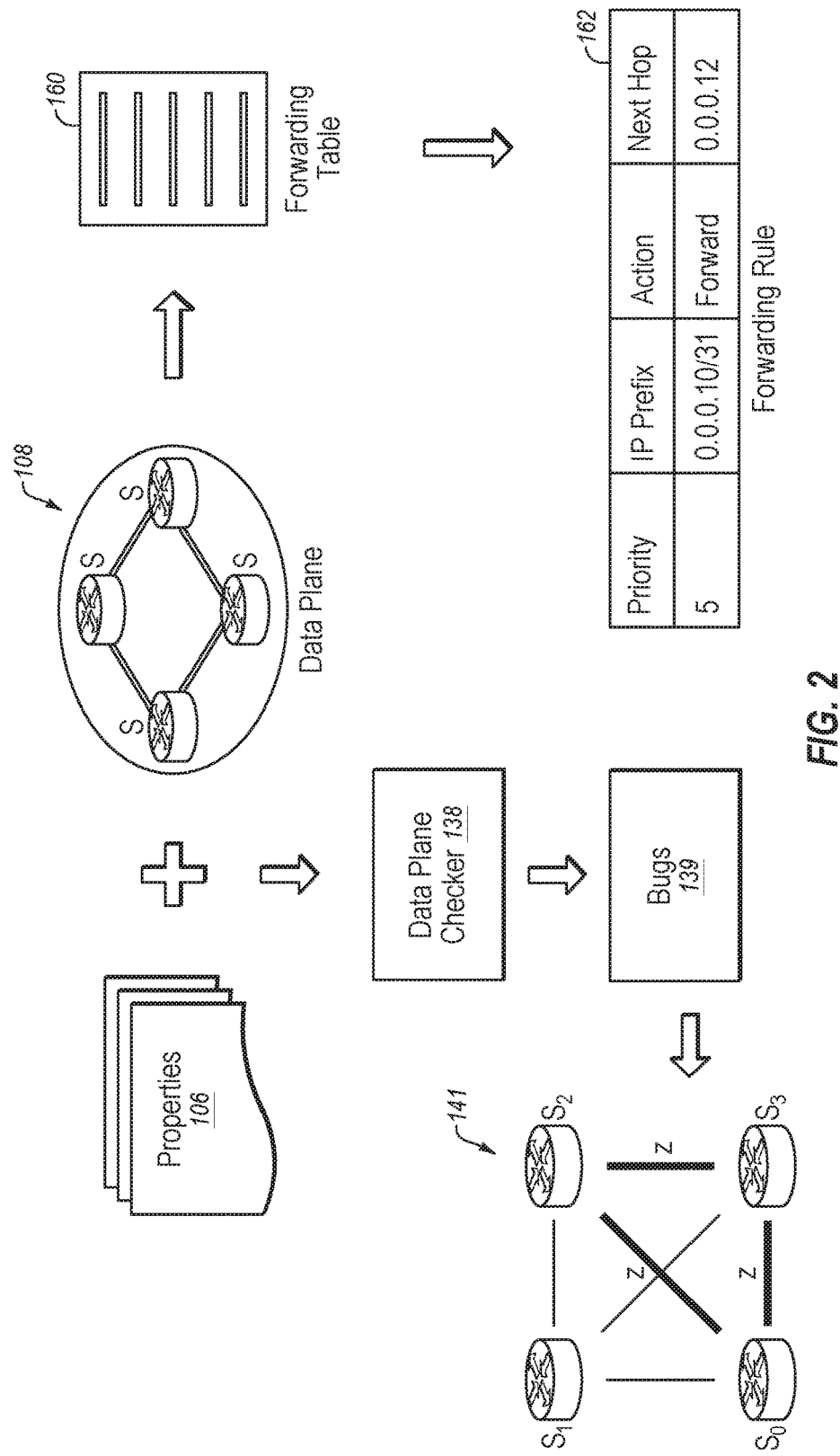
FIG. 2 depicts example components that may be used for network verification.

FIG. 2 depicts properties 106 and data plane 108. The properties 106 and the data plane 108 may be similar or comparable to the properties 106 and the data plane 108 of FIG. 1. The data plane 108 may include one or more switches, designated by the letter S. Each switch may be implemented physically as the system 2200 of FIG. 2. Additionally, it will be appreciated that will the term "switch" is used, the term also contemplates a router, a hub, or any other network device.

Each switch S in data plane 108 may include one or more forwarding tables 160, which may include one or more forwarding rules, such as example forward rule 162. The forwarding rules of the forwarding table 160 may provide instructions of how received packets should be routed through the network. For example, with reference to the forwarding rule 162, packets received at a switch with the forwarding rule 162 may check whether the IP address within the packets (e.g., the destination IP address, the source IP address, other IP addresses, or combinations thereof) falls within the range of addresses defined by the IP prefix associated with the rule. For example, the IP prefix "0.0.0.10/31" may be equivalent to the 32-bit sequence (4 bytes separated by dots) that starts with all zeros and ends with 101* (the binary representation of the numeral 10) where * denotes an arbitrary bit. Similarly, the IP prefix "0.0.0.0/28" may be equivalent to the 32-bit sequence starting with zeroes with four arbitrary bits at the end, e.g., 0 . . . 0****. Thus, the forwarding rule 162 would be potentially invoked for IP packets with the address with the numerical representation 0 . . . 01010 and 0 . . . 01011. If such a packet were received at the packet the action "forward" would be taken to forward the packet to the next hop address of 0.0.0.12. In some embodiments, the switch may identify the next hop address with a particular MAC address, a particular port, or some other forwarding mechanism. Additionally, the forwarding rule 162 may include a priority, such as Priority 5. The priority information may designate a relative level of importance as compared to other rules, such that the highest priority rule should be handled first. For example, if a second rule were also in the forwarding table 160 with a lower priority than the rule 162 that covered some of the same potential numerical range, a packet that fell within both ranges would be handled by the highest priority rule.

FIG. 2 further depicts a data plane checker 138, which may be configured to detect one or more bugs 139. As an example, a bug may include an undesirable forwarding loop, as depicted by reference numeral 141. For example, a packet may enter an infinite forwarding loop between the switches $S_0$ and $S_2$ and $S_3$ such that a reachability query fails, or such that an invariant is not met. The data plane checker 138 may include a program or set of operations operating on a computing system (e.g., the system 2200 of FIG. 22). In some embodiments, the data plane checker 138 may be implemented by the SDN controller 104 of FIG. 1

FIG. 3 is a flowchart of an example method 300 of detecting errors ("bugs") in a network, in accordance with at least one embodiment of the present disclosure. Method 300 may be performed by any suitable system, apparatus, or device. For example, the SDN controller 104 of FIG. 1, the data plane checker of 138 of FIG. 2, the system 2200 of FIG. 22, or one or more of the components thereof may perform one or more of the operations associated with method 300. In these and other embodiments, program instructions stored on a computer readable medium may be executed to perform one or more of the operations of method 300. Further, each act of method 300 may be static or dynamic, and may be performed online (e.g., in real-time), or offline. Further, each act may be performed incrementally or non-incrementally.

At block 302, a network topology and a data plane may be read. For example, data plane 108 (see e.g., FIG. 2) and an associated network topology (e.g., including one or more forwarding tables for each switch in data plane 108) may be identified. The network topology may include a physical layout of network switches and physical connections between and/or among those switches. Additionally or alternatively, the network topology may include forwarding rules from the switches of how packets are to be handled by those switches. In some embodiments, reading the network topology may be performed by storing a data representation of the physical layout of the network. Additionally or alternatively, one or more queries may be sent through the network to determine the network topology.

At block 304, properties may be read (e.g., for verification). For example, properties 106 (see e.g., FIG. 2) may be read such that a data plane checker knows what properties to verify. In some embodiments, properties may include one or more aspects of expected performance of the network as expected by a network administrator. For example, one property may include reachability of a packet from one switch in a network to another switch in the network, or from one physical location at one end of a network to another physical location at another end of the network. Another property may include number of hops or a pathway to follow through a network. In these and other embodiments, the properties may include invariants or other aspects of the network that are to be verified using the representation of the network At block 306, one or more data plane updates, if applicable, may be read. For example, data plane 108 (see e.g., FIG. 2), after each update, may be read. In some embodiments, a controller (e.g., the SDN controller 104 of FIG. 1) may monitor for and/or detect a data plane update. Additionally, the updates to be read may be understood to include events triggering changes to the network (such as a new network device being brought on line, or a link failing) or potential changes to the network (such as an administrator testing rerouting a certain IP prefix along a different route). In some embodiments, the data plane updates may be represented by changes to one or more forwarding rules in forwarding tables for one or more switches. For example, the addition of a new forwarding rule or the removal of a forwarding rule may be examples of data plane updates.

At block 308, a forwarding behavior representation, determined from one or more forwarding tables, may be created and/or updated. It is noted that a "forwarding behavior representation" may include a logical (e.g., machine checkable) representation of a data plane. More specifically, in some embodiments, a "forwarding behavior representation" may include an edge-labelled graph, as described more fully below. For example, the representation may be generated by adding forwarding rules one at a time to build out the representation. Examples of adding rules to a representation may be described with respect to FIGS. 6, 10-12 and 19.

Additionally, after the representation has been generated, rather than generating an entirely new representation, that representation may be modified based on the addition of new rules following the same description. In some embodiments, the representation may utilize atoms, which are described in further detail in FIGS. 4A-21.

At block 310, the forwarding behavior representation may be checked to verify satisfaction of properties (e.g., the properties of block 304. For example, using the forwarding behavior representation, performance of the network may be compared to the expected performance (e.g., the properties) to determine whether the property is met. For example, if the property is a certain invariant reachability, the forwarding behavior representation may be checked to verify that a packet will be routed through the network as expected. Violation or failure of the properties may be recognized as an error.

At block 312, any known errors ("bugs") may be outputted, and method 300 may return to block 306. For example, a report, print out, database, or other representation of any errors identified at block 310 may be stored or provided to a network administrator (e.g., the network administrator 102 of FIG. 2).

Modifications, additions, or omissions may be made to method 300 without departing from the scope of the present disclosure. For example, the operations of method 300 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 4A:
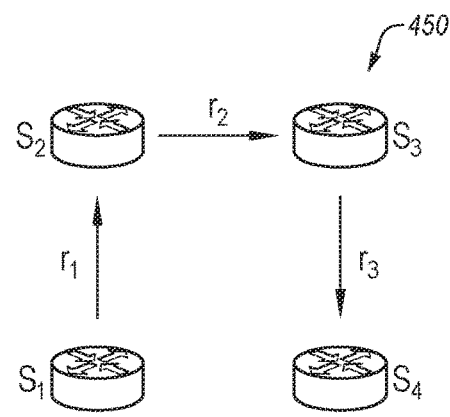
FIG. 4A illustrates an example forwarding graph.
Figure 4B:
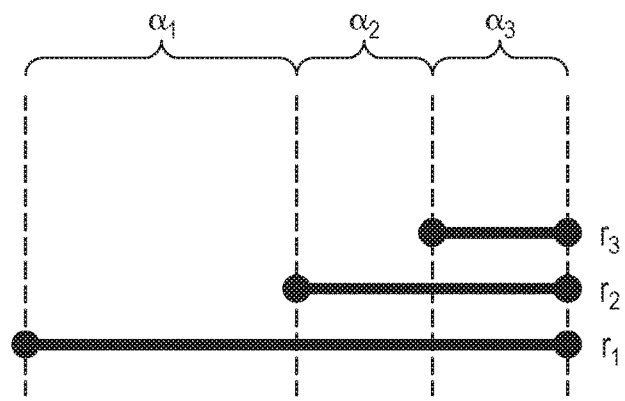
FIG. 4B depicts example intervals for various forwarding rules.
Figure 4C:
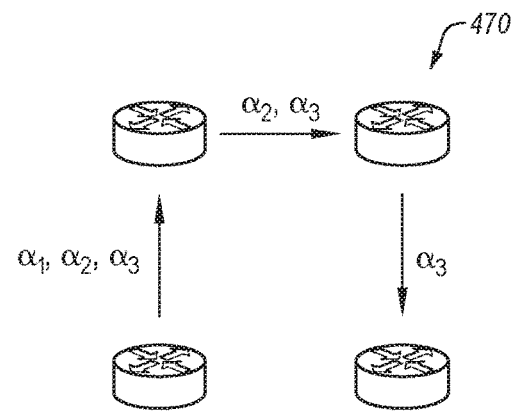
FIG. 4C illustrates an example edge-labelled graph.

FIGS. 4A through 4C introduce and provide examples of atoms. As used herein, an "atom" may refer to a range of network addresses, or numerical representations of network addresses, and may be represented as half-closed intervals. A half-closed interval may include an interval (e.g., a set of numbers in a range) that includes only one of the terminal numbers. For example, one example of a half-closed interval includes 5≤x<8, and may be depicted as [5, 8) where the square bracket indicates the end point number is included and the rounded parenthesis indicates the end point is excluded. Using the example IP prefix of "0.0.0.10/31," the prefix may be represented by the half-closed interval [0 . . . 01010:0 . . . 01100).

FIG. 4A depicts an example forwarding graph 450 of a network including switches $s_1$-$s_4$ and rules $r_1$-$r_3$ that may be generated based on the forwarding rules of the switches $s_1$-$s_4$. A collection of IP prefixes in the network may be represented by the atoms, e.g., the network addresses ranges depicted by half-closed intervals Additional examples of atoms and an associated description may be described with reference to FIGS. 7-9. By using atoms, the set of all atoms for the network may form a family of sets of network packets (e.g., each atom may represent a group of potential IP packets), such that Boolean combinations of rules in an entire network may be represented (e.g., all potential combinations of 0s and 1s for potential numerical representations of IP addresses, and therefore all sets of packets, may be included in the set of all atoms). In these and other embodiments, as described with respect to FIGS. 4B and 4C, a set of atoms may represent an IP prefix, for example, the range of addresses included in an IP prefix may span one or more atoms.

FIG. 4B depicts spans of ranges of addresses that are affected by rules $r_1$, $r_2$, and $r_3$. As shown in FIG. 4B, a range of addresses for rule $r_1$ includes atoms $\alpha_1$, $\alpha_2$, and $\alpha_3$, where each atom depicts a range of numerical addresses. The range of addresses for rule $r_2$ includes the atoms $\alpha_2$ and $\alpha_3$, and the range of addresses for rule $r_3$ includes the atom $\alpha_3$. Stated another way, of the depicted rules, the rule $r_1$ covers the broadest range of addresses, including the ranges associated with all three atoms, the rule $r_2$ covers the next broadest range of addresses, being applicable to the packets with addresses that fall within the ranges covered by the atoms $\alpha_2$ and $\alpha_3$, and the rule $r_3$ covers the narrowest range of addresses, only affecting those addresses that fall within the range of $\alpha 3$.

FIG. 4C depicts a single edge-labelled graph 470, which may be a visual example of the forwarding rule representation within the network. For example, the rule $r_1$ serves to forward packets from $s_1$ to $s_4$ and affects addresses within the range covered by the atoms $\alpha_1$, $\alpha_2$, $\alpha_3$, and thus the link from $s_1$ to $s_2$ is labeled with all three atoms affected by the rule. Additionally, the rule $r_2$ serves to forward packets from $s_2$ to $s_3$ and affects addresses within the range covered by the atoms $\alpha_2$, $\alpha_3$, and thus the link from $s_2$ to $s_3$ is labeled with those atoms. Also, the rule $r_3$ serves to forward packets from $s_3$ to $s_4$ and affects addresses within the range covered by the atom $\alpha_3$, and thus the link from $s_3$ to $s_4$ is labeled only with atom $\alpha_3$.

FIGS. 5A-5D, among other purposes, serve to illustrate ownership of an atom, and the iterative modification of the representation upon the addition or insertion of a new rule. FIGS. 5A-5D are based on FIGS. 4A-4C, with the addition of a rule $r_4$.

Figure 5B:
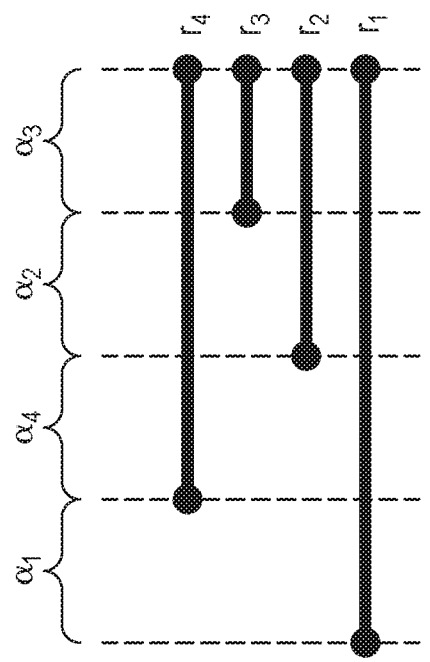
FIG. 5B depicts example intervals for various forwarding rules.
Figure 5A:
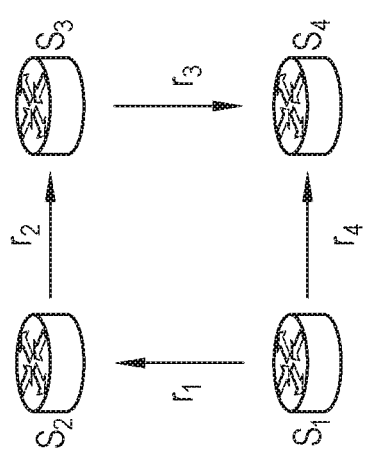
FIG. 5A depicts an example forwarding graph.

FIG. 5A depicts an example forwarding graph including switches $s_1$-$s_4$ and rules $r_1$-$r_4$. In this example, rule $r_4$ is a new rule inserted into the network, and rule $r_4$ has priority over rule $r_1$. The new rule $r_4$ may be operable at switch $s_1$ to route certain traffic to $s_4$. For example, a network administrator may designate that certain traffic is to be routed in a different direction. As another example, a link (not illustrated) may fail and break an existing pathway and the new rule may include a rerouting of that traffic. As another example, the rerouting may be based on a network optimization program running to load balance where traffic is routed. The priority of new rules may be determined by the network administrator adding the rule, the optimization process, or the fail-over process. For example, certain packets for a certain range may be identified as being malicious and a rule may be introduced (even temporarily) to drop all packets within an address range and may have a very high priority so that all packets except critical packets (e.g., those with even higher priority) are dropped.

FIG. 5B depicts ranges of addresses for rules $r_1$, $r_2$, $r_3$, and $r_4$. FIG. 5B depicts the rules in vertical order of priority with the top being the highest priority rule and the bottom being the lowest priority rule. As shown in FIG. 5B, the introduction of the rule $r_4$ introduces a new distinct range of addresses that does not have a corresponding atom depicted in FIGS. 4A-4C. Thus, the new atom $\alpha_4$ must be generated to cover the range of addresses that start at the beginning point of $\alpha_4$ and terminate at the starting point of $\alpha_2$. Additionally, the creation of the new atom effectively decreases the range of addresses covered by the atom $\alpha_1$. Such a process may be referred to as splitting atoms, as the atom $\alpha_1$ was turned into two atoms, $\alpha_1$ and $\alpha_4$. The address range for rule for rule $r_1$ includes atoms $\alpha_1$, $\alpha_2$, $\alpha_3$, and $\alpha_4$, the address range for rule $r_2$ includes atoms $\alpha_2$ and $\alpha_3$, the address range for rule $r_3$ includes atom $\alpha_3$, and the address range for rule r4 includes atoms $\alpha_2$, $\alpha_3$, and $\alpha_4$.

In some embodiments, the owner of an atom may represent the rule that is designated as the highest priority rule for the atom for a given switch. Or in other words, the owner of an atom may be the rule that governs the forwarding behavior with respect to the numerical range of network addresses of the atom for a given switch. The owner of an atom may be stored as ownership information, for example, in a data structure as described in FIG. 10.

As illustrated in FIG. 5B, the owner of the atom $\alpha_1$ may be the rule $r_1$ at the switch $s_1$, as the rule is the highest priority rule for that particular range of addresses potentially covered by the rule $r_1$. Furthermore, the rule $r_1$ would be the owner for the address ranges covered by the new atom $\alpha_2$, $\alpha_3$, and $\alpha_4$ in FIGS. 4A-4C. However, the new rule $r_4$ and the creation of the atom $\alpha_4$ show that the rule $r_4$ has a higher priority than the rule $r_1$ at switch $s_1$ for those atoms, so the new rule $r_4$ would be the owner of the new atom $\alpha_4$ as well as the atoms $\alpha_2$ and $\alpha_3$.

Figure 5D:
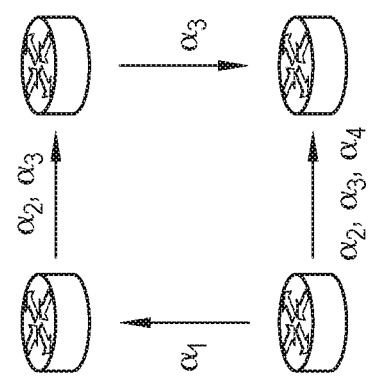
FIG. 5D depicts an example edge-labelled graph.
Figure 5C:
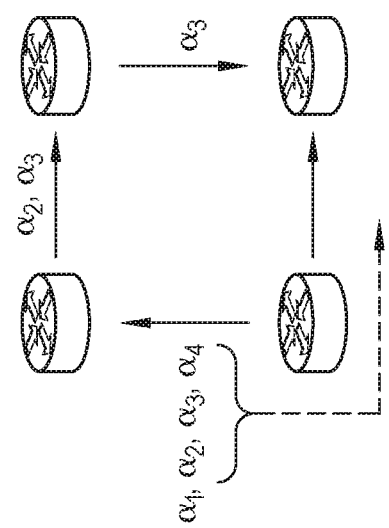
FIG. 5C illustrates an example edge-labelled graph.

FIG. 5C illustrates a single edge-labelled graph, wherein atoms $\alpha_1$, $\alpha_2$, $\alpha_3$ represent an interval for rule $r_1$, atoms $\alpha_2$ and $\alpha_3$ represent an interval for rule $r_2$, and atom $\alpha_3$ represents an interval for rule $r_3$. Further, according to various embodiments, the edge-labelled graph of FIG. 5C may be transformed in response to rule $r_4$ being added to the network. For example, as described above, the ownership information for the atoms $\alpha_2$, $\alpha_3$, and $\alpha_4$ may be the new rule $r_4$. In these and other embodiments, the atoms will be reassigned to the link of the new rule (the link from $s_1$ to $s_4$) as illustrated in the dashed arrow.

FIG. 5D depicts an edge-labelled graph which is transformed from the edge-labelled graph of FIG. 5C It is noted that the graph transformation may avoid construction of multiple overlapping forwarding graphs by transforming a single edge-labelled graph.

Figure 6A:
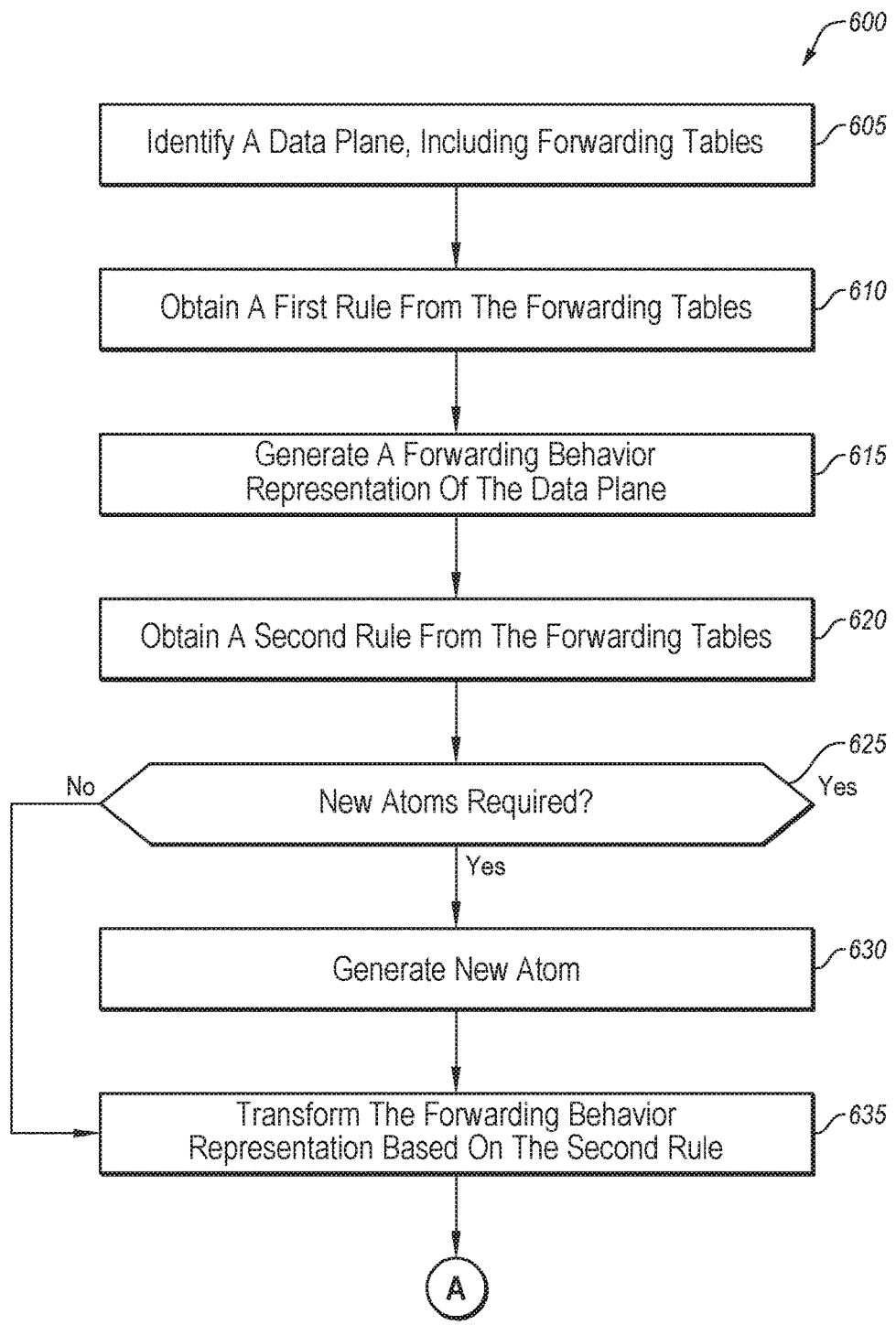
FIGS. 6A and 6b are a flowchart of an example method for verifying a network.
Figure 6B:
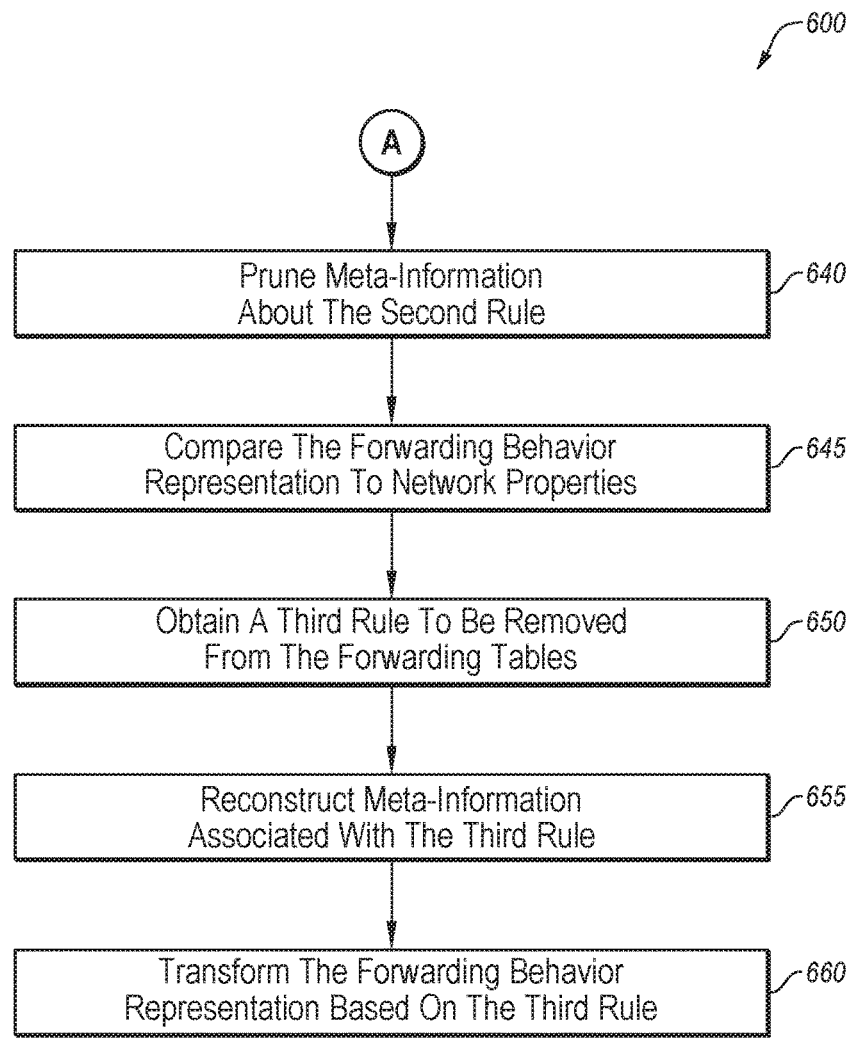

FIGS. 6A and 6B are a flowchart of an example method 600 of verifying a network, in accordance with at least one embodiment of the present disclosure. The method 600 may be performed by any suitable system, apparatus, or device. For example, the SDN controller 104 of FIG. 1, the data plane checker of 138 of FIG. 2, the system 2200 of FIG. 22 or one or more of the components thereof may perform one or more of the operations associated with method 600. In these and other embodiments, program instructions stored on a computer readable medium may be executed to perform one or more of the operations of method 600.

At block 605, a data plane for routing traffic through a network may be identified. The data plane may include multiple switches and each switch may include a forwarding table of how that particular switch is to handle packets.

At block 610, a first forwarding rule may be obtained from the forwarding tables. For example, the first forwarding rule may be read from a forwarding table. As another example, one or more forwarding tables may be copied and the associated forwarding rules may be obtained from the copies. As an additional example, the forwarding rules may be requested from the switches.

At block 615, a forwarding behavior representation of the data plane may be generated based on the first rule. For example, as described above, the data plane may be represented as an edge-labelled graph where each switch is represented as a node and each link is represented as an edge. Additionally or alternatively, one or more atoms may be used to represent the potential range of network addresses that may be included in packets being routed through the data plane. The first forwarding rule may affect one or more atoms. In some embodiments, the forwarding behavior representation may be generated by incrementally adding rules in a step-wise fashion until each rule from the forwarding tables has been added to the forwarding behavior representation. Examples of adding forwarding rules to such a representation may be illustrated and described with respect to FIGS. 10 and 19. In some embodiments, the representation may store ownership information of a particular atom of a single highest priority rule, rather than all potential owners for a given atom.

In some embodiments, the forwarding behavior representation may be obtained by generating the representation as described with respect to block 615. Additionally or alternatively, a forwarding behavior representation may be obtained from another electronic device or entity that previously generated the representation, or from a storage location where the behavior was generated previously.

At block 620, a second forwarding rule may be obtained from the forwarding tables. For example, a second rule may be read from the forwarding tables. As another example, a modification to the forwarding table may be detected or monitored. As another example, a rule to be removed from the forwarding behavior representation may be received or identified.

At block 625, a determination may be made whether any new atoms are required to cover the range of addresses covered by the rule from block 620. For example, with reference to FIGS. 5A-5D and the addition of rule $r_4$, a determination may be made that a new atom was needed as the numerical range affected by the rule covered a span that did not have a distinct range covering the numerical range. If it is determined that a new atom is needed, the method 600 may proceed to block 630. If no new atoms are needed, the method 600 may proceed to the block 635.

At block 630, new atoms may be generated. For example, the atoms may be split as described with respect to FIGS. 5A-5D. One example of generating new atoms may be described in further detail with respect to an operation Create_Atoms as described with respect to FIG. 11. In some embodiments, the generation of new atoms may be repeated until the range of addresses of the second rule is completely covered by atoms, whether pre-existing atoms, newly generated atoms, or both.

At block 635, the forwarding behavior representation may be transformed based on the second rule. For example, the ownership information may be stored, generated, and/or updated for atoms affected by the second forwarding rule. As another example, a set of beginning values for the address range associated with the second rule may be generated or updated. In these and other embodiments, ownership information may be reconstructed for rules that are removed, such that information regarding potential owners for a next highest priority rule for an atom may be determined.

At block 640, meta-information about the second rule may be pruned. For example, if adding a rule, the ownership information for atoms affected by the rule may be updated or verified, and any additional ownership information of other potential owners may be pruned from the representation. In these and other embodiments, the alternative potential owners that are not the highest priority owners may be considered redundant information to the forwarding behavior. Such an approach may save storage space of storing the representation. In some embodiments, the pruning may occur simultaneously with the transformation of block 635.

At block 645, the forwarding behavior representation may be compared to one or more network properties. For example, a data plane checker may seek to verify one or more properties of expected network behavior, and may compare the expected behavior to the representation. For example, routing behavior may be checked for infinite loops, broken links, undeliverable addresses, etc.

At block 650, a third rule may be obtained to be removed from the forwarding tables. In some embodiments, the third rule may be identified as already having been removed. In some embodiments, a network administrator may test the removal of a rule before actually implementing the removal of the third rule.

At block 655, meta-information associated with the third rule may be reconstructed. For example, because ownership information may be stored for a highest priority rule, if the highest priority rule is removed, a next highest priority rule for an atom may be identified. An example of such an approach may be discussed in further detail in FIG. 17.

In some embodiments, in addition to storing the highest priority rule for a particular range of addresses, a forwarding behavior representation may additionally include a set of rules that cover a range of addresses that begin with a particular numerical value in a prioritized list. By storing this information, a next highest priority rule for an atom may be determined if a particular rule that is an owner is removed. An example of such a data structure may include rules_begins_with as described below with respect to FIG. 10.

At block 660, the forwarding behavior representation may be transformed based on removing the third rule. For example, one or more atoms may or may not be reassigned to different links, ownership information for one or more atoms may be updated, etc. In some embodiments, the block 660 may include revising an existing edge-labeled graph rather than generating a snapshot of a new edge-labeled graph or other representation. For example, in traditional approaches, an entirely new representation may be generated for each time of verification. In some embodiments, the transformation of the block 660 may be performed without generating an entirely new representation.

In contrast to conventional methods that may require that each network packet equivalence class, which induces a forwarding graph, be checked separately, embodiments of the present disclosure may include constructing a representation of the forwarding behavior of an entire network, wherein the representation may be incrementally and efficiently updated with each data plane change. For example, with reference back to FIGS. 4A-4C and FIGS. 5A-5D, conventional methods may construct forwarding graphs for each group of packets based on the IP prefix of how they are handled. As used herein, the term equivalence class may include a group of network packets that are handled the same in the network. For example, one equivalence class would include the packets in the address range of $\alpha_1$, another would be the packets in the address range of $\alpha_1$. By introducing the new rule $r_4$, all equivalence classes would have to be re-computed, which generally requires traversal of rules in different forwarding tables. Thus, the conventional methods required the handling of the entire class of packets covered by $r_4$ would have to be analyzed, including at switches $s_1$, $s_2$, $s_3$, and $s_4$ using conventional methods. However, by using atoms and transforming the representation, for example in the transition illustrated in FIGS. 5C and 5D, such an approach may be simplified and streamlined. For example, the atoms may represent persistent groups of equivalence classes.

Modifications, additions, or omissions may be made to the method 600 without departing from the scope of the present disclosure. For example, the operations of method 600 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Incrementally maintaining atoms may include various advantages. First, since there tends to be fewer atoms than rules in a network, atoms may effectively compress information on how packets flow in the network. Second, atoms may allow a system to efficiently infer which rules are affected by the removal and/or insertion of a rule. More specifically, in the example described with reference to FIGS. 5A-5D, only rules $r_1$ and $r_4$ on switch $s_1$ need to be inspected to transform the edge-labelled graph, rather than all rules as in conventional systems, which construct multiple forwarding graphs.

Figure 7:
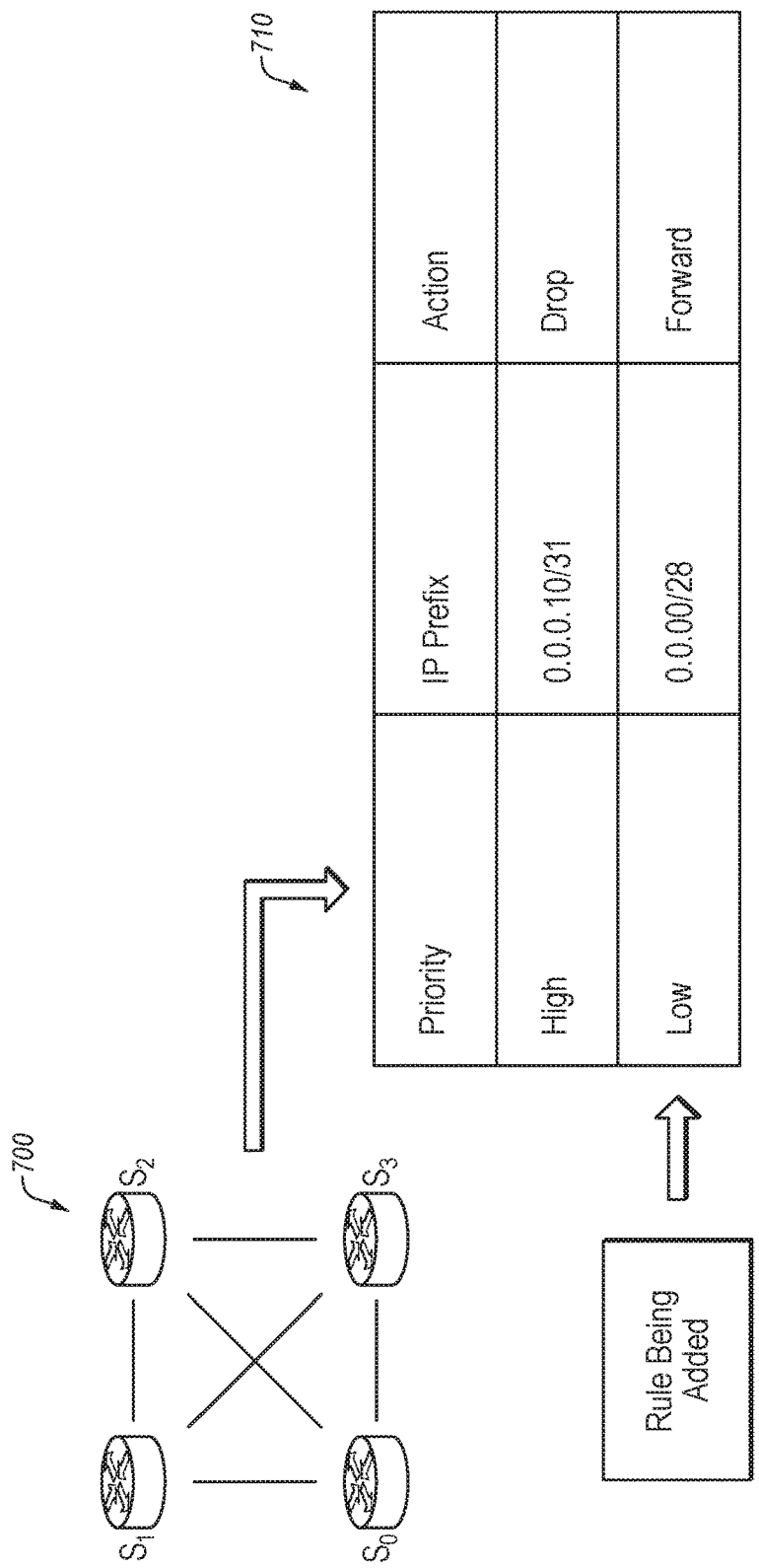
FIG. 7 illustrates a network topology and a forwarding table.

FIG. 7 depicts a network topology 700 and a forwarding table 710 for a network switch. Forwarding table 710 includes entries for two rules, rule $r_H$ having a high priority and rule $r_L$ having a low priority. Rule $r_H$ drops packets whose destination address matches the IP prefix "0.0.0.10/31" (using the IPv4 CIDR format, although IPv6 addresses and address ranges are contemplated by the present disclosure), and rule, $r_L$ forwards packets destined to the IP prefix "0.0.0.0/28."

As noted above, IP prefixes may be considered as intervals, and more specifically half-closed intervals. For example, an IP prefix of rule $r_H$ corresponds to a half-closed interval [10:12) because the IP prefix "0.0.0.10/31" is equivalent to the 32-bit sequence that starts with all zeros and ends with 101* where * denotes an arbitrary bit. The short-hand notation of [10:12) indicates that the last byte can only represent the $10^{th}$ or $11^{th}$ possible Boolean combination of varying the last 4 bits, and the $1$-$9^{th}$ and $12$-$16^{th}$ possible Boolean combinations are outside of the range of addresses covered by the IPR prefix. Similarly, the IP prefix "0.0.0.0/28"=[0:16) since 0.0.0.0/28=0 . . . 0****, meaning the IP prefix covers all 16 possible Boolean combinations of varying the last four bits between 0 and 1.

As described above, the IP prefixes of all the rules in the network may be dissected into disjoint half-closed intervals, or into a set of one or more atoms that cover the range of network addresses covered by the IP prefix. With reference to FIG. 8, and the rules $r_H$ and $r_L$, each of the resulting half-closed intervals may be referred to as an "atom" because each atom induces a Boolean lattice, as illustrated by a Hasse diagram 900 in FIG. 9. In Hasse diagram 900, atoms [0:10), [10:12), and [12:16) correspond to $\alpha_0$, $\alpha_1$ and $\alpha_2$ in FIG. 8, respectively.

By construction of atoms, an IP prefix of a rule r may be represented as a set of atoms one or more. An IP prefix representation may be denoted by interval(r), representing the range of addresses affected by the rule r. For example, an IP prefix for rule $r_H$ is interval($r_H$) and may correspond to a singleton set including the range of addresses corresponding to the atom $\alpha_1$, whereas an IP prefix for rule $r_L$, is interval($r_L$) and may correspond to the range of addresses corresponding to the combination of the atoms $\alpha_0$, $\alpha_1$, $\alpha_2$. Using these atoms, the set difference [interval($r_L$)−interval($r_H$)] may be used to describe that the IP prefix of rule $r_L$, may only match packets that are not dropped by the higher-priority rule $r_H$. Stated another way, because the rule $r_H$ is a higher priority rule, the packets that fall within the range of addresses designated by the IP prefix associated with $r_H$ will be dropped, while the packets that are within the range identified by the rule $r_L$ and outside of the set $r_H$ will be handled according to the rule $r_L$.

For each of the methods depicted in the flowcharts in FIGS. 10-21, the methods may be performed by any suitable system, apparatus, or device. For example, system 2200 of FIG. 22 or one or more of the components thereof may perform one or more of the operations associated with such methods. In these and other embodiments, program instructions stored on a computer readable medium may be executed to perform one or more of the operations of the methods. Further, each act of the methods may be static or dynamic, and may be performed online (e.g., in real-time), or offline. Further, each act may be performed incrementally or non-incrementally.

Additionally, modifications, additions, or omissions may be made to any of the methods of FIGS. 10-21 without departing from the scope of the present disclosure. For example, the operations of the methods may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 10:
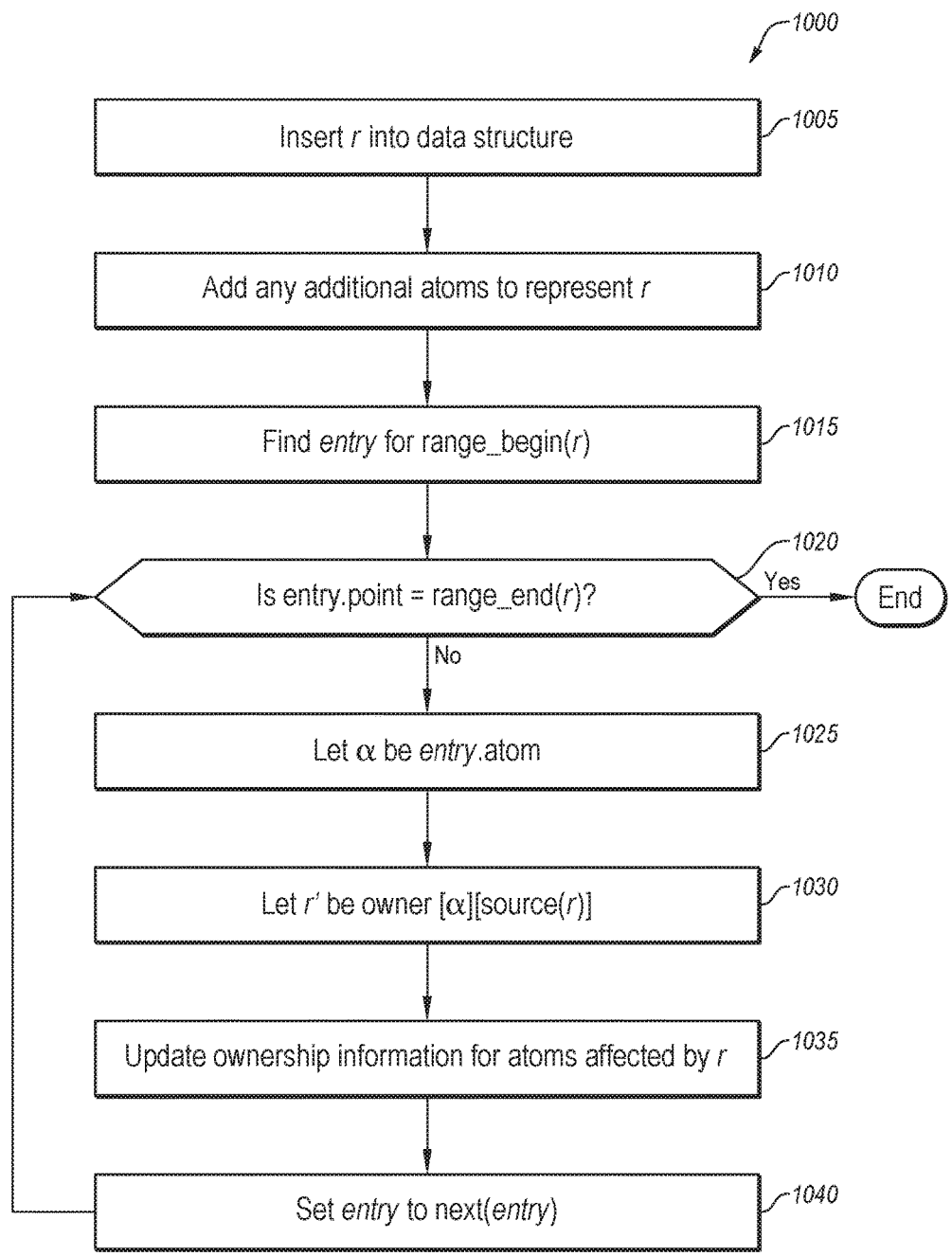
FIG. 10 illustrates a flowchart of an example method for inserting a rule.

FIG. 10 illustrates a flowchart of an example method for inserting or adding a rule r into a forwarding behavior representation, in accordance with one or more embodiments of the present disclosure.

At block 1005, the rule r may be inserted into a data structure. For example, when generating a binary tree representation, the data structure may include rules_begin_with [source(r)][range_begin(r)]. The data structure rules_begin_with may include a prioritized list of rules that originate at the switch source(r) (for example, with reference to FIG. 5A, source($r_1$) is the switch $s_1$) and that affect a range of addresses that begin with the value range_begin(r) (for example, with reference to FIG. 8, range_begin($r_L$) is 0). Thus, the data structure rules_begin_with may identify all rules for a given network switch that affect a range of addresses beginning at the same numerical value. Additionally, the list of rules is prioritized such that relative priorities between the rules in rules_begin_with may be distinguished by the order of the list.

As another example, the data structure may include the Patricia tree of source(r) when generating a Patricia tree representation. For example, each switch in a network may be represented by a Patricia tree. The rule r may be added to the Patricia tree for the switch source(r). Adding the rule to the Patricia tree may be in addition to adding the rule to the rules_begin_with data structure.

At block 1010, any additional atoms that may be used to represent r may be added. For example, with reference to FIG. 8, if $r_H$ was already present and $r_L$ was being inserted, the atoms $\alpha_0$ and $\alpha_2$ may be added. An example implementation of the block 1010 may be illustrated in FIG. 11.

At block 1015, an entry for range_begin(r) may be found. The data structure entry may identify both the numerical value of the address range for range_begin(r) (entry.point) and the atom associated with that numerical value (entry.atom). For example, with reference to FIG. 8, entry for range_begin($r_L$) may include both the numerical value 0 and the atom identifier $\alpha_0$.

At block 1020, a determination may be made whether entry.point (e.g., the numerical value of entry) is the same as range_end(r). For example, with reference to FIG. 8, range_end($r_L$) may be 16. Thus, the block 1020 may determine whether the entire numerical range for r has passed through the loop of blocks 1025-1040. If entry.point and range_end (r) are the same, the method 1000 may proceed to end. If they are not the same, the method 1000 may proceed to block 1025.

At block 1025, the variable α may be set to entry.atom. The block 1025 may introduce the variable α to be used in various other blocks of the method 1000.

At block 1030, r' may be set as owner[α][source(r)]. The data structure owner may be a data structure that identifies a highest priority rule associated with a particular atom at an identified switch. For example, multiple rules may affect the address range covered by the atom α, but only one rule, the owner, will actually act on packets falling within that range of addresses at the given switch. The data structure owner identifies that owner.

In some embodiments, by only storing a single owner for an atom, rather than all potentially owning rules, storage space utilized in storing the representation may be reduced. By reducing the amount of storage space required, the present disclosure may facilitate the improved performance of a computer itself. Additionally, it may facilitate the more rapid transmission and exchange of information across a network.

At block 1035, the ownership information may be updated for the atom α based on the newly inserted rule r. An example of such updating may be explained with reference to FIG. 12.

At block 1040, entry may be set to next(entry). The operation next( ) may identify the next entry in numerical order. For example, with reference to FIG. 8, if entry identified the numerical value 0 and the atom $α_0$, the next(entry) may identify the numerical value 10 and the atom $α_1$. After block 1040, the method 1000 may return to the block 1020. The method 1000 may thus iterate through the blocks 1020-1040 until all the atoms within the range of addresses covered by the inserted rule r have had their respective ownership information updated.

In these and other embodiments, a new forwarding rule may be added to a forwarding behavior representation. Furthermore, associated tasks such as generating new atoms, updating ownership information, etc. may also be performed. In some embodiments, generating a forwarding behavior representation may be accomplished by starting with a blank representation and iteratively adding new rules until all rules of forwarding table in a data plane are covered by the representation. Additionally or alternatively, a new rule may be added to an existing representation using the method 1000 of FIG. 10.

Figure 11:
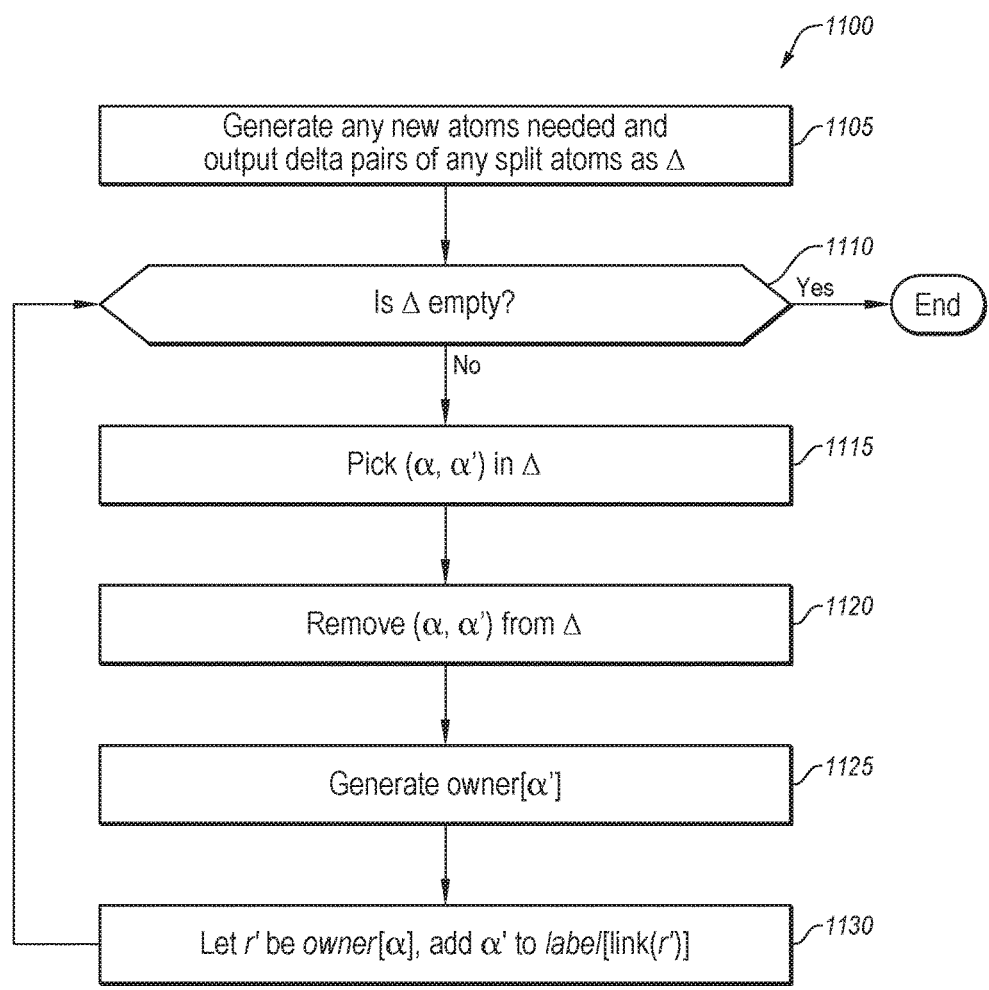
FIG. 11 illustrates a flowchart of an example method for adding additional atoms to a representation.

FIG. 11 illustrates a flowchart of an example method 1100 for adding additional atoms to a representation, in accordance with one or more embodiments of the present disclosure. For example, the method 1100 may be one example implementation of the block 1010 of FIG. 11.

At block 1105, a data structure Δ may be generated based on an operation Create_Atoms(range(r)). The operation Create_Atoms may act on a range of addresses (e.g., range(r)) may identify the range of addresses affected by the rule r) to generate any new atoms to be introduced to completely cover the range of addresses covered by r. For example, with reference to FIG. 8, if the rule $r_H$ was already part of the representation, and the rule $r_L$ was being inserted, two new atoms would be generated, namely, the atoms $α_0$ and $α_1$. To generate the new atoms, the operation Create_Atoms outputs a set of delta-pairs of the form (α, α'), where α is the new atom split off from the previous atom and α' is the newly created atom split off from the previous atom. If an original atom α covered the range [10:16] and the new atom α' covered the range [12:16], the delta-pair would include the original atom α that is now [10:12] and the new atom α' covering the range [12:16].

At block 1110, a determination may be made as to whether the data structure Δ is empty. For example, such a determination may indicate that the range of the new rule r is already covered by one or more atoms, or that all delta pairs in Δ have been addressed. If Δ is empty, the method 1100 may proceed to end. If Δ is not empty, the method may proceed to the block 1115 to loop through blocks 1115 through 1130 iteratively to handle each of the delta pairs in Δ.

At block 1115, a delta pair (α, α') may be selected from Δ.

At block 1120, the delta pair (α, α') may be removed from Δ.

At block 1125, the data structure owner[α] may be generated. For example, the ownership information from α may be applied to α'. Thus, in creating the new atoms the ownership information from the already-existing atom may be applied to the newly generated atom.

At block 1130, the variable r' may be set as owner[α], and α' may be added to label[link(r')]. The data structure label [link( )] may identify a set of atoms that are associated with a particular link, link( ) in the network topology. For example, with reference to FIGS. 5A-5D, label[link($r_2$)] includes the list of atoms associated with the link over which $r_2$ is effective, namely, $α_2$ and $α_3$. As another example label[link($r_3$)] includes $α_3$. Thus, the new atom α' may be added to the set of atoms that affect the link of the already-existing atom.

After block 1130, the method 1100 may return to the block 1110 to determine if all delta pairs have been addressed.

Figure 12:
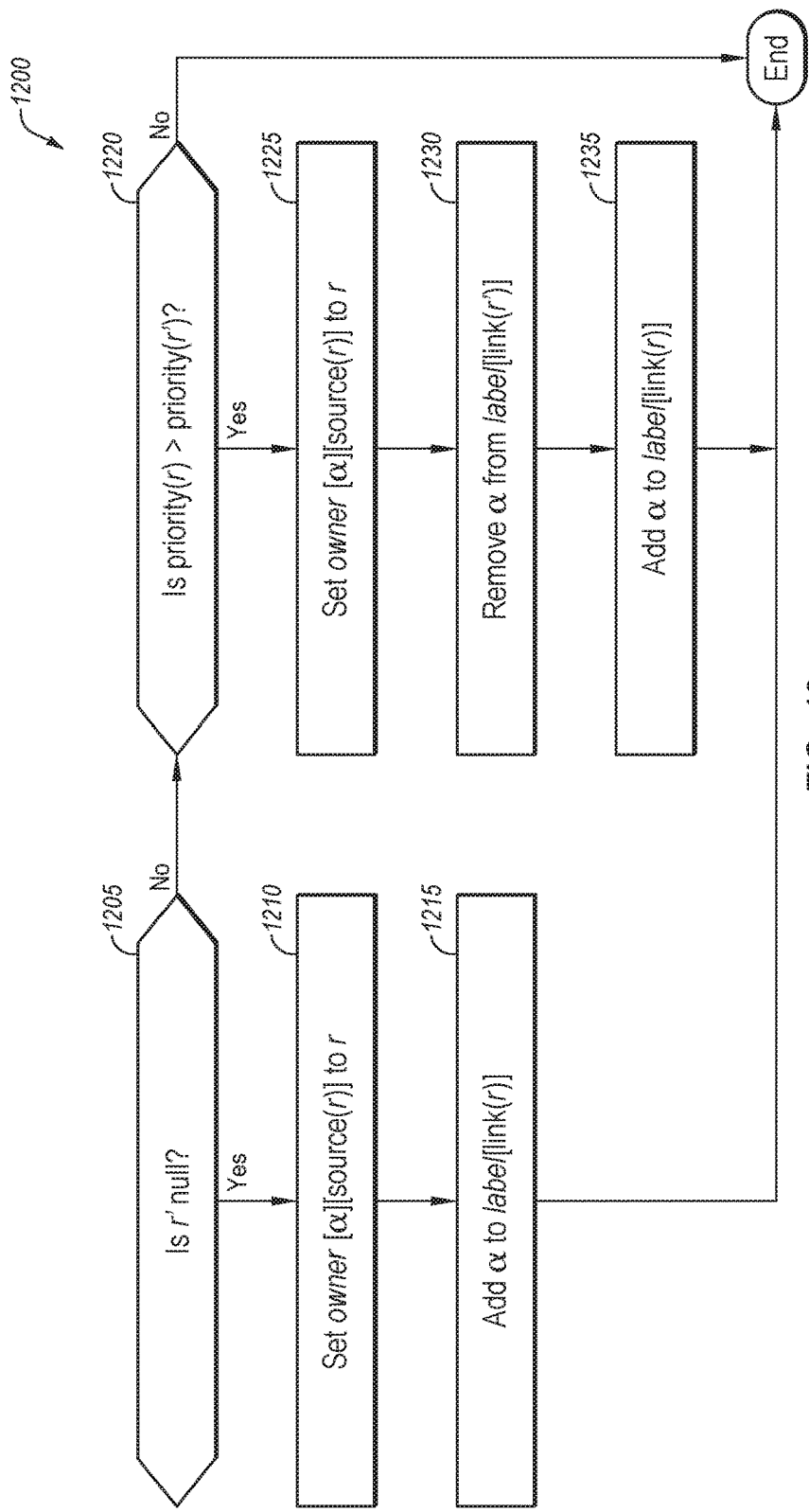
FIG. 12 illustrates a flowchart of an example method for updating ownership information.

FIG. 12 illustrates a flowchart of an example method 1200 for updating ownership information, in accordance with one or more embodiments of the present disclosure. For example, the method 1200 may be one example implementation of block 1035 of FIG. 10.

At block 1205, a determination is made as to whether r' is null. From FIG. 10, r' may include the owner of the atom α. Thus, block 1205 may query whether the atom had a previous owner. If r' is null the method 1200 may proceed to block 1210. If r' is not null, the method 1200 may proceed to the block 1220.

At block 1210, the data structure owner[a][source(r)] may be set to r. Such an operation may assign the new rule r as the owner of the atom α at the network device identified by source(r).

At block 1215, the atom α may be added to the data structure label[link(r)]. Such an operation may associate the atom α with the link from the network topology affected by the rule r. Such an operation may facilitate the transformation of an edge labeled graph. After block 1215, the method 1200 may end.

At block 1220, a determination may be made as to whether the rule r has a higher priority than the rule r'. If it is determined that r has a higher priority, the method 1200 may proceed to the block 1225. If it is determined that r does not have a higher priority, the method 1200 may end (e.g., by leaving the ownership unchanged as there is a rule r' with higher priority than the newly inserted rule for the atom α).

At block 1225, the data structure owner[α][source(r)] may be set to r. Such an operation may assign the new rule r as the owner of the atom α at the network device identified by source(r), and may be similar or comparable to the block 1210.

At block 1230, the atom α may be removed from the data structure label[link(r')]. Such an operation may disassociate the atom α with the link from the network topology affected by the rule r'. Such an operation may facilitate the transformation of an edge labeled graph.

At block 1235, the atom α may be added to the data structure label[link(r)]. Such an operation may associate the atom α with the link from the network topology affected by the rule r. Such an operation may facilitate the transformation of an edge labeled graph, and may be similar or comparable to the block 1215. After the block 1235 the method 1200 may end.

Figure 13:
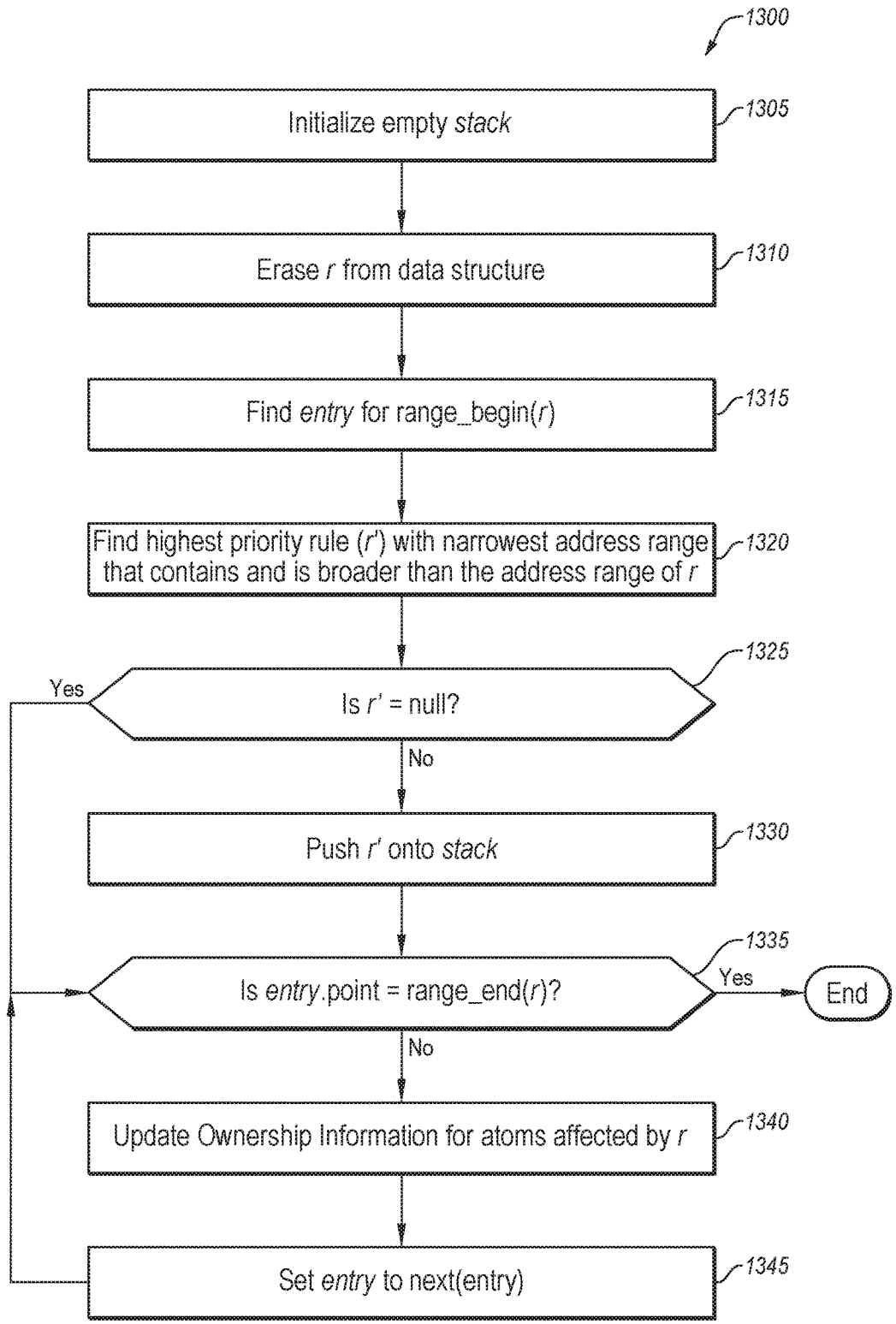
FIG. 13 illustrates a flowchart of an example method for removing a rule from a representation.

FIG. 13 illustrates a flowchart of an example method 1300 for removing a rule r from a representation, in accordance with one or more embodiments of the present disclosure.

At block 1305, a data structure stack may be initialized as an empty stack of data elements that may have an element pushed onto the stack (e.g., becoming the next top element) or popped from the stack (e.g., removing the top element, exposing the next element down). In some embodiments, the top element of the stack is the accessible element of the stack.

At block 1310, the ruler may be erased from a data structure. For example, when a representation includes a binary tree representation, the rule r may be removed from the data structure rules_begin_with [source(r)][range_begin (r)] The data structure rules_begin_with[source(r)] [range_begin(r)] may be as described above with respect to the block 1005 of FIG. 10.

As another example, the data structure may include the Patricia tree of source(r) when utilizing a Patricia tree representation. For example, each switch in a network may be represented by a Patricia tree. The rule r may be erased from the Patricia tree for the switch source(r). Erasing the rule from the Patricia tree may be in addition to erasing the rule from the rules_begin_with data structure.

At block 1315, an entry for range_begin(r) may be found. The block 1315 may be similar or comparable to the block 1015 of FIG. 10.

At block 1320, a rule r', if available, may be found where r' may represent the highest priority rule with the narrowest address range that contains and is broader than the address range of r. One example of an implementation of the block 1320 may be illustrated in FIG. 14A, for example, when using a binary tree representation. Another example of an implementation of the block 1320 may be illustrated in FIGS. 14B and 14C, for example, when using a Patricia tree representation. Such an operation may identify a potential rule that covers a range beyond what the rule being removed covers, and that may have ownership information to be updated.

At block 1325, a determination may be made whether r' is null. If r' is null, the method 1300 may proceed to the block 1335. If r' is not null, the method 1300 may proceed to the block 1330.

At block 1330, the rule r' may be pushed onto the data structure stack.

At block 1335, a determination may be made whether entry.point (e.g., the numerical value of entry) is the same as range_end(r). The operation 1335 may be similar or comparable to the block 1020 of FIG. 10. If entry.point and range_end(r) are the same, the method 1300 may proceed to end. If they are not the same, the method 1300 may proceed to block 1340.

At block 1340, the ownership information for atoms affected by r may be updated by reference to the stack. One example of an implementation of the block 1340 may be illustrated in FIG. 16.

At block 1345, entry may be set to next(entry). The operation 1345 may be similar or comparable to the block 1040 of FIG. 10. By looping through the blocks 1335-1345, the ownership information for all rules in the stack may be updated.

In these and other embodiments, a forwarding rule may be removed from a forwarding behavior representation. Furthermore, associated tasks such as updating ownership information and/or recreating pruned meta-information may also be performed.

Figure 14A:
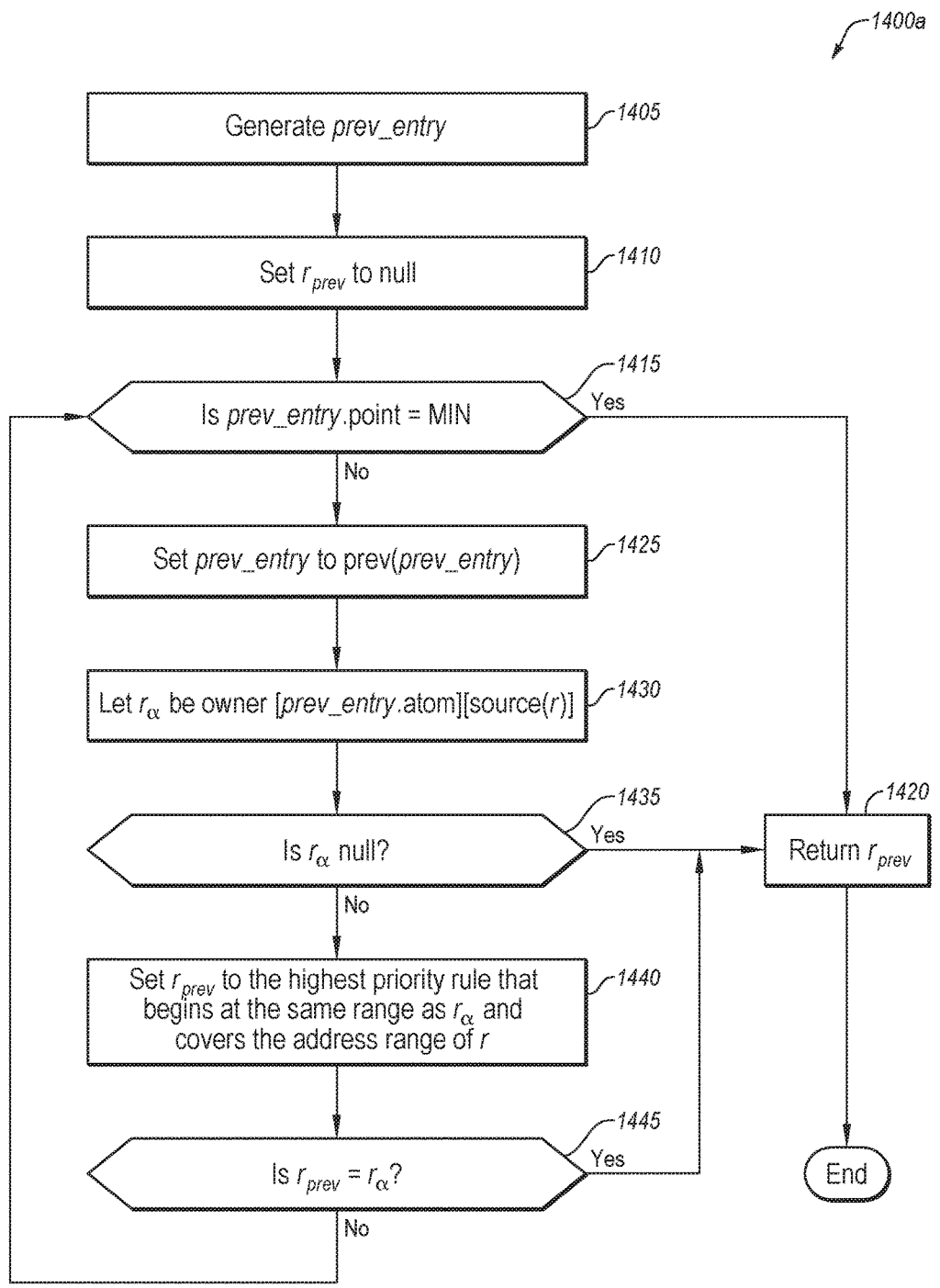
FIG. 14A illustrates a flowchart of an example method for finding the highest-priority rule among rules whose IP prefix covers the IP prefix of the given rule.

FIG. 14A illustrates a flowchart of an example method 1400a for finding the highest-priority rule (if any) among rules whose IP prefix covers the IP prefix of rule r, in accordance with one or more embodiments of the present disclosure. The method 1400a may be one example of the block 1320 of FIG. 13. For example, the method 1400a may include an approach to finding rules starting before r that may be affected by removing r when using a binary tree representation.

At block 1405, the data structure prev_entry may be generated. For example, entry may be copied to the data structure prev_entry that may be of the same form as entry (e.g., may identify both the numerical value of the address range for range_begin(r) (entry.point) and the atom associated with that numerical value (entry.atom)). Additionally or alternatively, the data structure prev_entry may be generated in some other manner to include one or more similar elements to entry.

At block 1410, $r_{prev}$ may be initialized by being set to a null value.

At block 1415, a determination may be made whether prev_entry.point is equal to a minimum potential address value, MIN. For example, a determination may be made whether prev_entry.point is equal to zero if zero is the lowest possible numerical value for addresses. If prev_entry.point is equal to MIN, the method 1400a may proceed to block 1420. If prev_entry.point is not equal to MIN, the method 1400a may proceed to block 1425.

At block 1420, the value of $r_{prev}$ may be returned and then the method 1400a may proceed to end.

At block 1425, the data structure prev_entry may be set to prev(prev_entry). The operation prev( ) may identify the previous entry in numerical order. For example, with reference to FIG. 8, if prev_entry identified the numerical value 10 and the atom $\alpha_1$, the prev(prev_entry) may identify the numerical value 0 and the atom $\alpha_0$.

At block 1430, the owner of the identified atom of prev_entry (e.g., owner[prev_entry.atom][source(r)]) may be identified as $r_a$.

At block 1435, a determination may be made whether $r_a$ is null. If $r_a$ is null, the method 1400a may proceed to the block 1420. If $r_a$ is not null, the method 1400a may proceed to block 1440.

At block 1440, $r_{prev}$ may be set to the highest priority rule that begins at the same range as $r_a$ and covers the address range of r. One example of an implementation of the block 1440 may be illustrated in FIG. 15.

At block 1445, a determination may be made whether $r_{prev}$ is equal to $r_a$. If $r_{prev}$ is is equal to $r_a$, then the method 1400a may proceed to the block 1420. If $r_{prev}$ is not equal to $r_a$, the method 1400a may return to the block 1415 to continue to go through earlier numerically valued entry data structures.

In some embodiments, the efficiency of the method 1400a may be improved by storing part of the computation in removing a rule, and restoring it during removal of other rules.

Figure 14B:
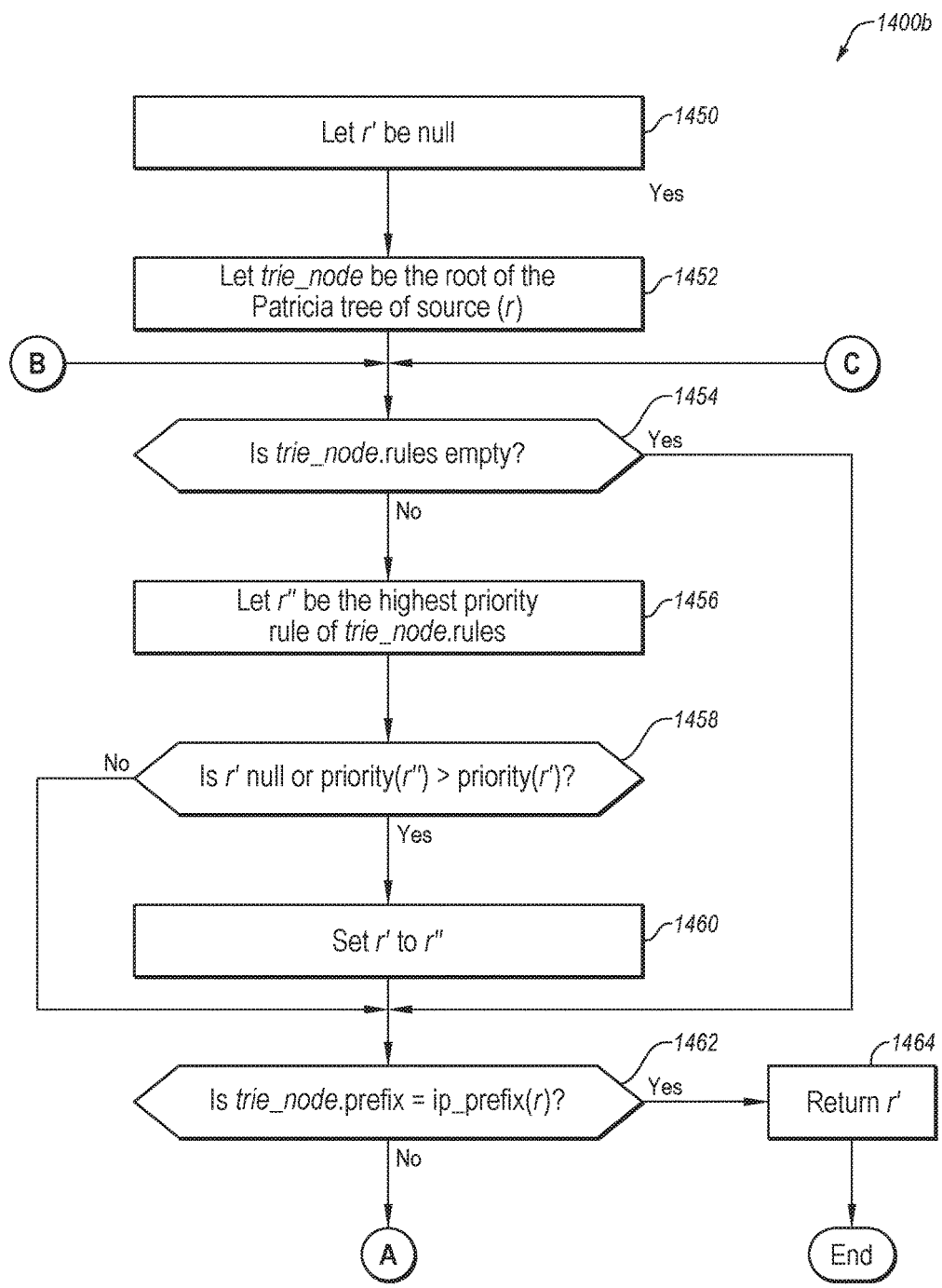
FIGS. 14B and 14C illustrate a flowchart of another example method for finding the highest-priority rule among rules whose IP prefix covers the IP prefix of the given rule.
Figure 14C:
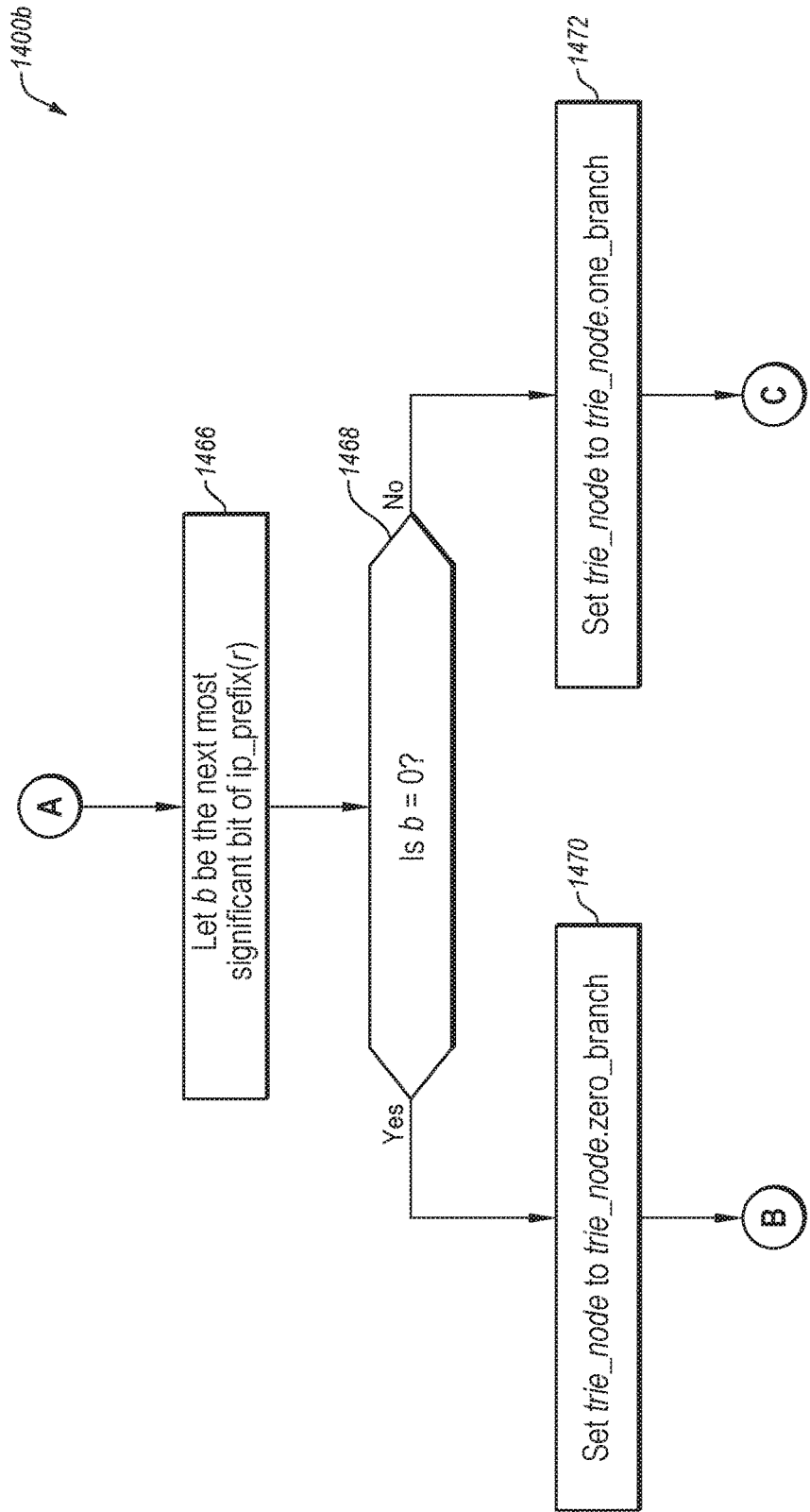

FIGS. 14B and 14C illustrate a flowchart of another example method 1400b for finding the highest-priority rule among rules whose IP prefix covers the IP prefix of the given rule, in accordance with one or more embodiments of the present disclosure. For example, the method 1400b may include an approach to finding rules starting before r that may be affected by removing r when using a Patricia tree representation.

At block 1450, the rule r' may be set to null. The block 1450 may initialize the value of r' such that it can be used in other steps of the method 1400b of FIGS. 14B and 14C.

At block 1452, the data structure trie_node may be set as the root of the Patricia tree of source(r). The data structure trie_node may represent a numerical starting point of an entire address range for a given rule, and may span one or more atoms and one or more rules that start at that numerical starting point (trie_node.rules). Additionally or alternatively, the set of rules of (trie_node.rules) may be a prioritized list, such that the highest priority rule may be identified based on the order of (trie_node.rules). The block 1452 may initialize the Patricia tree such that an analysis of the Patricia tree may begin at the root of the Patricia tree.

At block 1454, a determination may be made as to whether the data structure trie_node.rules is empty. For example, a determination may be made as to whether any rules start at the numerical range represented by the node of the Patricia tree represented by trie_node. If trie_node.rules is empty, the method 1400b may proceed to the block 1462. If trie_node.rules is not empty, the method 1400b may proceed to the block 1456.

At block 1456, the highest priority rule of trie_node.rules may be set as r".

At block 1458, a determination may be made as to whether r' is null or whether the priority of the rule r" (priority(r")) is higher than the priority of the rule r' (priority (r')). Thus, the block 1458 may determine whether the candidate rule r' is the highest priority rule. If r' is null or if the priority of r" is higher than the priority of r', the method 1400b may proceed to block 1460. If neither condition is met, the method 1400b may proceed to the block 1462.

At block 1460, the rule r' may be updated to the ruler r". For example, the candidate rule r' may be updated to the highest priority rule from the node of the Patricia tree being analyzed.

At block 1462, a determination may be made whether trie_node.prefix is the same as ip_prefix(r). The operator ip_prefix(r) may represent a range of addresses affected by the rule r, which may be represented by an IP prefix. The element trie_node.prefix may represent the range of addresses reachable by the given node of the Patricia tree. For example, if a Patricia tree has been navigated along the branches of 0-1-0-0-1- . . . -1 * * * with 3 potential elements remaining (as represented by the asterisks), the trie_node.prefix may represent the range of addresses reachable from that node, namely, the variations of possible values for the 3 remaining elements. Thus, the block 1462 may determine whether all potential rules whose IP prefix covers the IP prefix of rule r have been analyzed. If trie_node.prefix is the same as ip_prefix(r), the method 1400b may proceed to the block 1464. If trie_node.prefix is not the same as ip_prefix(r), the method 1400b may proceed to the block 1466.

At block 1464, the candidate rule, r', may be returned as identifying the highest priority rule with the narrowest address range that contains, and is broader than, the address range of r. After the block 1464, the method 1400b may proceed to end.

At block 1466, the next most significant bit of ip_prefix(r) may be set to the variable b. For example, when there are still portions of the Patricia tree before the starting point of the rule r, the Patricia tree may continue to be analyzed along branches that follow ip_prefix(r). The variable b may be used in determining which branches to follow in the Patricia tree.

At block 1468, a determination may be made whether b is zero. If b is zero, the method 1400b may proceed to the block 1470. If b is not zero (e.g., if b is one), the method 1400b may proceed to the block 1472.

At block 1470, the data structure trie_node may be set to trie_node.zero_branch. The zero_branch of the trie_node may include traversing the Patricia tree along another zero branch, or effectively lengthening the IP prefix by an additional zero (e.g., from 0.0.0.0/28 to 0.0.0.0/29). The method 1400b may proceed from the block 1470 back to the block 1454 to analyze the next node in the Patricia tree.

At block 1472, the data structure trie_node may be set to trie_node.one_branch. The one_branch of the trie_node may include traversing the Patricia tree along another one branch, or effectively lengthening the IP prefix by an additional one (e.g., from 0-0-0 . . . 0 * * * * to 0-0-0 . . . 0 1 * * *). The method 1400b may proceed from the block 1472 back to the block 1454 to analyze the next node in the Patricia tree.

Figure 15:
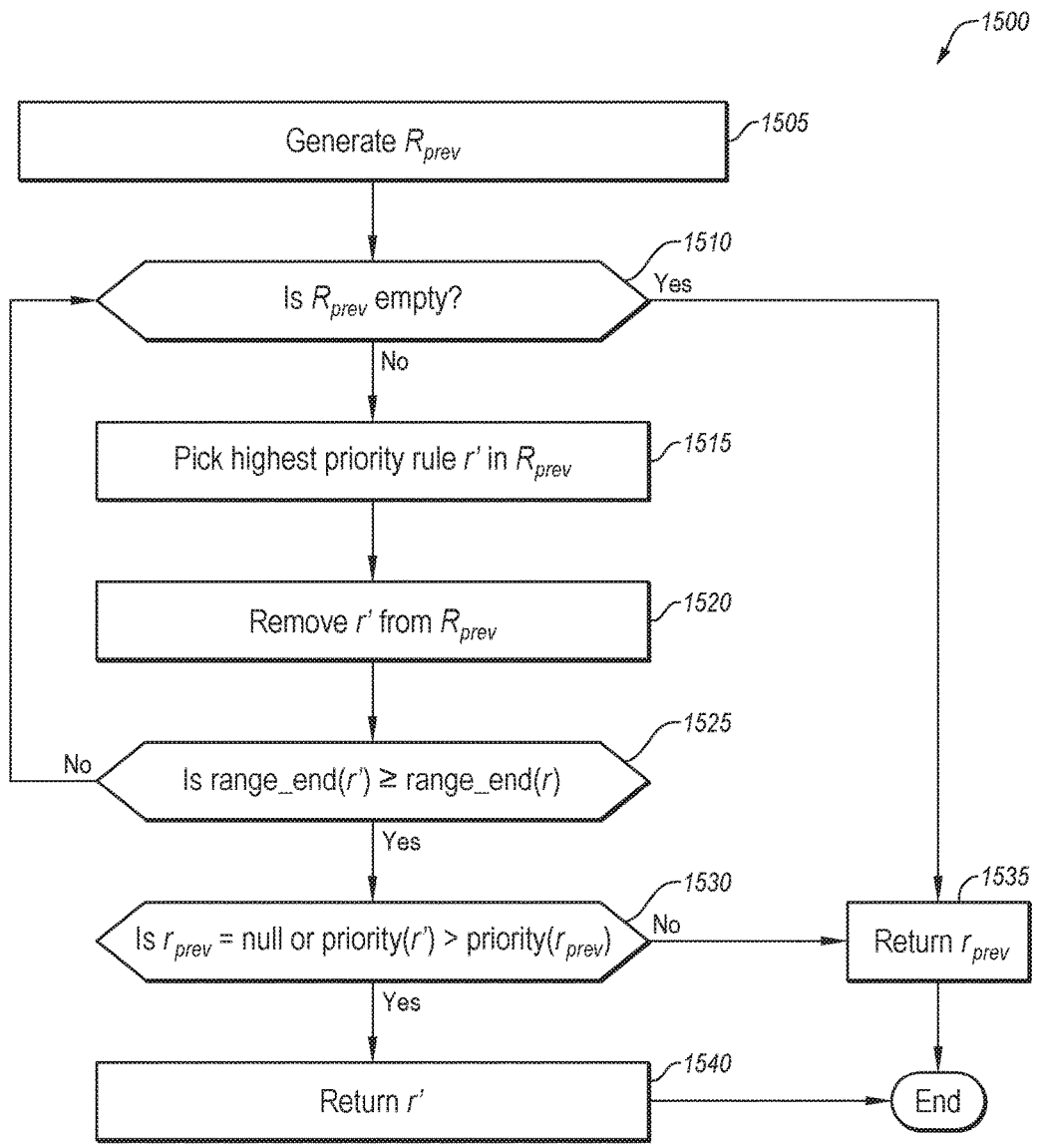
FIG. 15 illustrates a flowchart of an example method for finding an owner of a rule.

FIG. 15 illustrates a flowchart of an example method 1500 for finding an owner of a rule, in accordance with one or more embodiments of the present disclosure. The method 1500 may be one example of an implementation of the block 1440 of FIG. 14A.

At block 1505, the data structure $R_{prev}$ may be generated as a list of rules. For example, the rules contained in the data structure rules_begin_with[source(r)][range_begin($r_a$)] may be copied to $R_{prev}$. As another example, $R_{prev}$ may be generated in some other manner to include one or more of the rules from rules_begin_with[source(r)][range_begin ($r_a$)]. Thus, the block 1505 may identify all rules for a given switch, source(r), that begin at the same numerical value as a candidate rule $r_a$.

At block 1510, a determination may be made whether $R_{prev}$ is empty to allow a loop through all elements of $R_{prev}$. If $R_{prev}$ is empty, the method 1500 may proceed to block 1535. If $R_{prev}$ is not empty, the method 1500 may proceed to block 1515.

At block 1515, a highest priority rule r' may be picked from $R_{prev}$. For example, the first entry in the data structure $R_{prev}$ may be picked.

At block 1520, r' may be removed from $R_{prev}$.

At block 1525, a determination may be made whether range_end(r')≥range_end(r). For example, a determination may be made whether the rule being analyzed, r', extends at least to the ending numerical value of a rule r being removed from a representation. If the range_end(r') is greater than or equal to range_end(r), the method 1500 may proceed to the block 1530. If the range_end(r') is not greater than or equal to range_end(r), the method 1500 may return to the block 1510. Such an approach may facilitate going through all the rules in $R_{prev}$ to identify the highest priority rule that covers the entire span of the address range of the rule r.

At block 1530, a determination may be made whether $r_{prev}$ (e.g., from FIG. 14A) is null or whether priority(r')>priority($r_{prev}$). If both conditions are not met, the method 1500 may proceed to the block 1535. If either condition is met, the method 1500 may proceed to the block 1540.

At block 1535, the current value of $r_{prev}$ may be returned, and then the method 1500 may end.

At block 1540, the current value of r' may be returned, and then the method 1500 may end.

Figure 16:
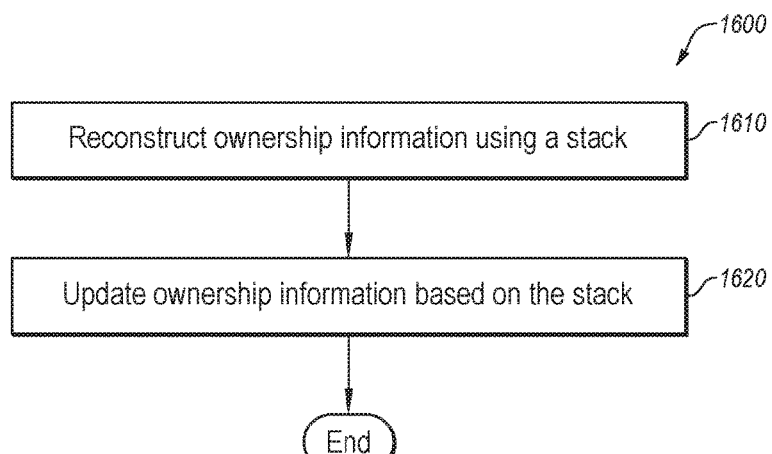
FIG. 16 illustrates a flowchart of an example method for updating ownership information.

FIG. 16 illustrates a flowchart of an example method 1600 for updating ownership information, in accordance with one or more embodiments of the present disclosure. The method 1600 may be one example implementation of the block 1340 of FIG. 13.

At block 1610, ownership information may be reconstructed using a stack. One example implementation of the block 1610 may be illustrated in FIG. 17.

At block 1620, ownership information may be updated based on the stack of the block 1610. One example implementation of the block 1620 may be illustrated in FIG. 18. After block 1620, the method 1600 may end.

Figure 17:
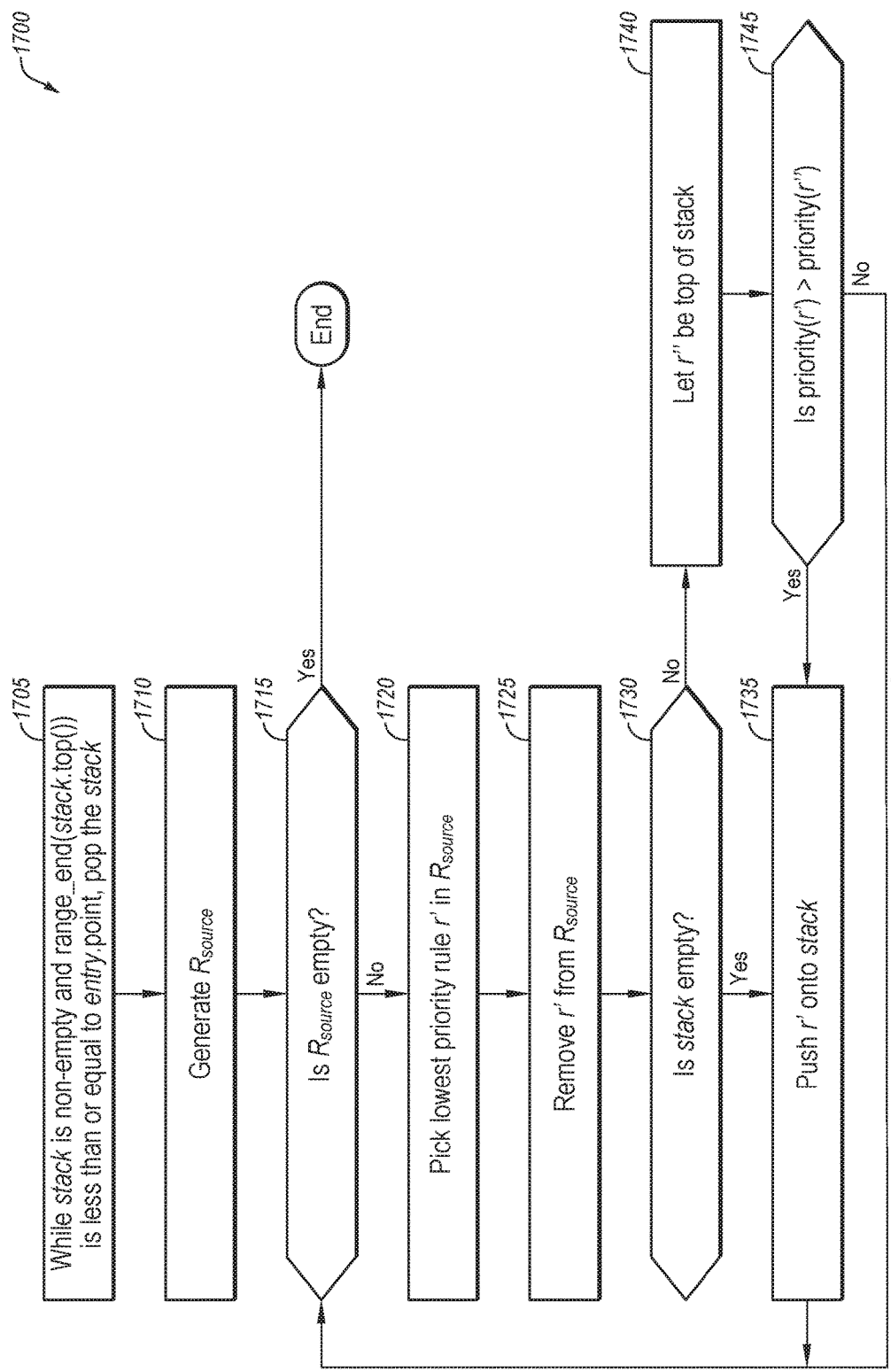
FIG. 17 illustrates a flowchart of an example method for reconstructing ownership information.

FIG. 17 illustrates a flowchart of an example method 1700 for reconstructing ownership information, in accordance with one or more embodiments of the present disclosure. FIG. 17 may illustrate one example implementation of the block 1610 of FIG. 16.

At block 1705, while stack is non-empty and range_end (stack.top( ))≤entry.point, pop the stack. In block 1705, stack may represent a similar or the same data structure as that initialized at block 1305 of FIG. 13. The identifier stack.top( ) may include the top-most element in stack. Thus, the block 1705 may check whether the top rule of the stack has the range of addresses that it effects end before the entry.point of the rule r being removed. If so, the rule at the top of the stack is unaffected by removal of the rule and may be removed from the stack.

At block 1710, the data structure $R_{source}$ may be generated as a list of rules. For example, the rules contained in the data structure rules_begin_with[source(r)][entry.point] may be copied to $R_{source}$. As another example, $R_{source}$ may be generated in some other manner to include one or more of the rules from rules_begin_with[source(r)][entry.point]. Thus, the block 1710 may identify all rules for a given switch, source(r), that begin at at entry.point.

At block 1715, a determination may be made whether $R_{source}$ is empty. If $R_{source}$ is empty, the method 1700 may end. If $R_{source}$ is not empty, the method 1700 may proceed to the block 1720.

At block 1720, the lowest priority rule r' in $R_{source}$ may be picked from $R_{source}$. For example, the lowest priority rule r' may be the last element of $R_{source}$ if copied in order at the block 1710.

At block 1725, the rule r' may be removed from $R_{source}$.

At block 1730, a determination may be made whether the stack is empty. If the stack is empty, the method 1700 may proceed to the block 1735. If the stack is not empty, the method 1700 may proceed to the block 1740.

At block 1735, the rule r' may be pushed onto the stack. After the block 1735, the method 1700 may return to the block 1715.

At block 1740, the top element of the stack may be identified as rule r".

At block 1745, a determination may be made whether the priority of the rule r' is higher than the priority of the rule r". If the priority of the rule r' is higher than the priority of the rule r", the method 1700 may proceed to the block 1735 where the rule r' is pushed onto the stack. If the priority of the rule r' is not higher than the priority of the rule r", the method 1700 may return to the block 1715. By looping back through the blocks 1715 to 1745, the entire set of rules in $R_{source}$ may be analyzed.

In some embodiments, the method 1700 may be adjusted to use a doubly-linked list instead of a stack. In such an embodiment, the rules may be inserted starting from a highest priority rule to a lowest priority rule. In these and other embodiments, the method may be ceased once lower priority rules are encountered.

Figure 18:
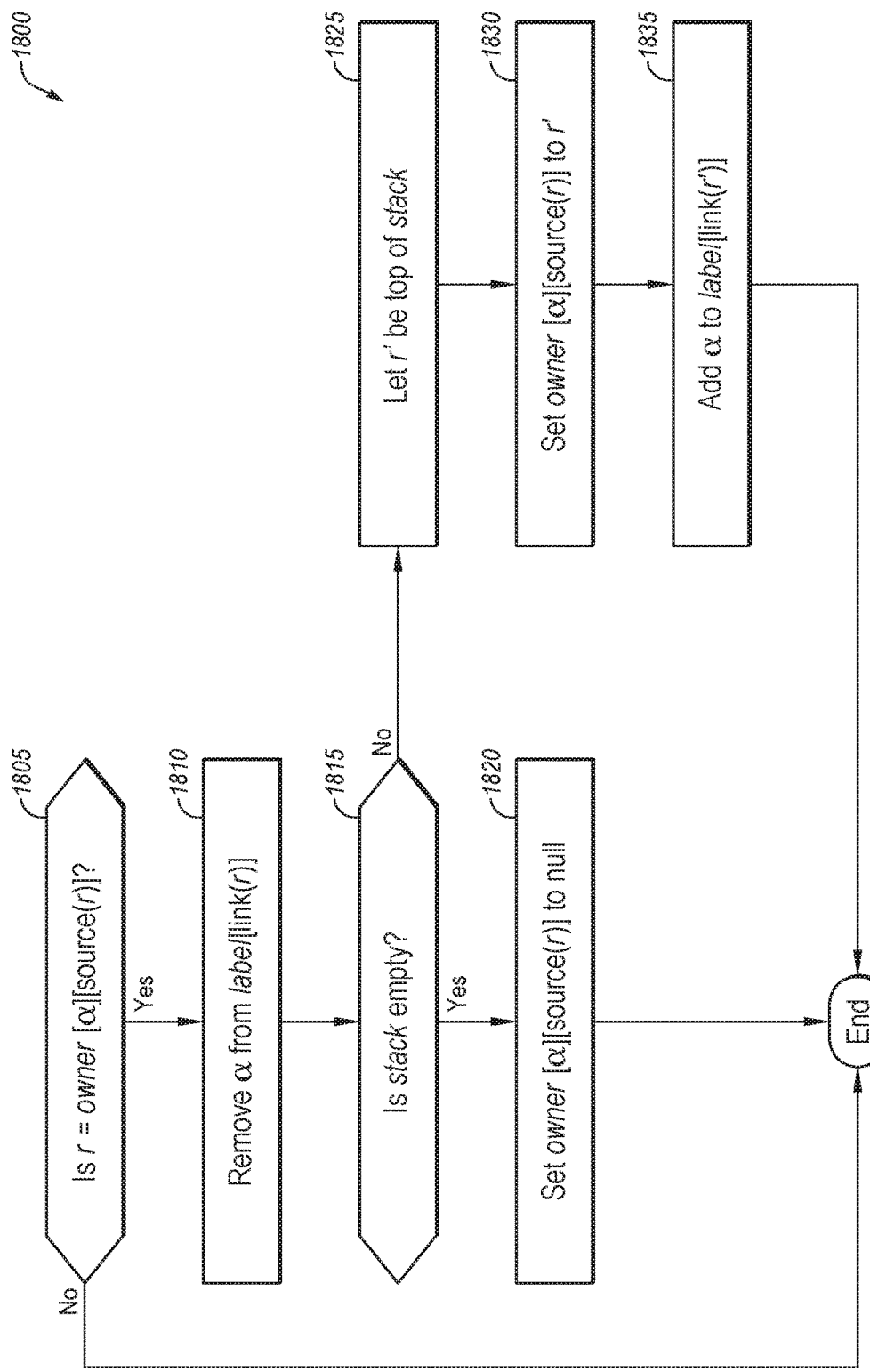
FIG. 18 illustrates a flowchart of an example method for updating ownership information based on a stack.

FIG. 18 illustrates a flowchart of an example method 1800 for updating ownership information based on a stack, in accordance with one or more embodiments of the present disclosure. FIG. 18 may illustrate one example implementation of the block 1620 of FIG. 16.

At block 1805, a determination may be made whether a rule r being removed from a representation is the owner of an atom α for a given network switch source(r) (e.g., is r the same as owner[α] [source(r)]). If it is determined that r is the same as owner[α][source(r)], the method 1800 may proceed to the block 1810. If it is determined that r is not the same as owner[α][source(r)], the method 1800 may proceed to end.

At block 1810, the atom α may be removed from label [link(r)]. Such a block may facilitate the transformation of an edge-labeled graph.

At block 1815, a determination may be made whether a stack is empty. In some embodiments the stack may be the stack of the method 1700 of FIG. 17. If the stack is empty, the method 1800 may proceed to the block 1820. If the stack is not empty, the method 1800 may proceed to the block 1825.

At block 1820, the ownership information may be set to null, e.g., owner[α][source(r)] may be set to null. After the block 1820, the method 1800 may end.

At block 1825, the top element of the stack may be identified as rule r'.

At block 1830, the ownership information may be set to r', e.g., owner[α][source(r)] may be set to r'.

At block 1835, the atom α may be added to label[link(r')]. Such a block may facilitate the transformation of an edge-labeled graph. After the block 1835, the method 1800 may end.

Figure 19:
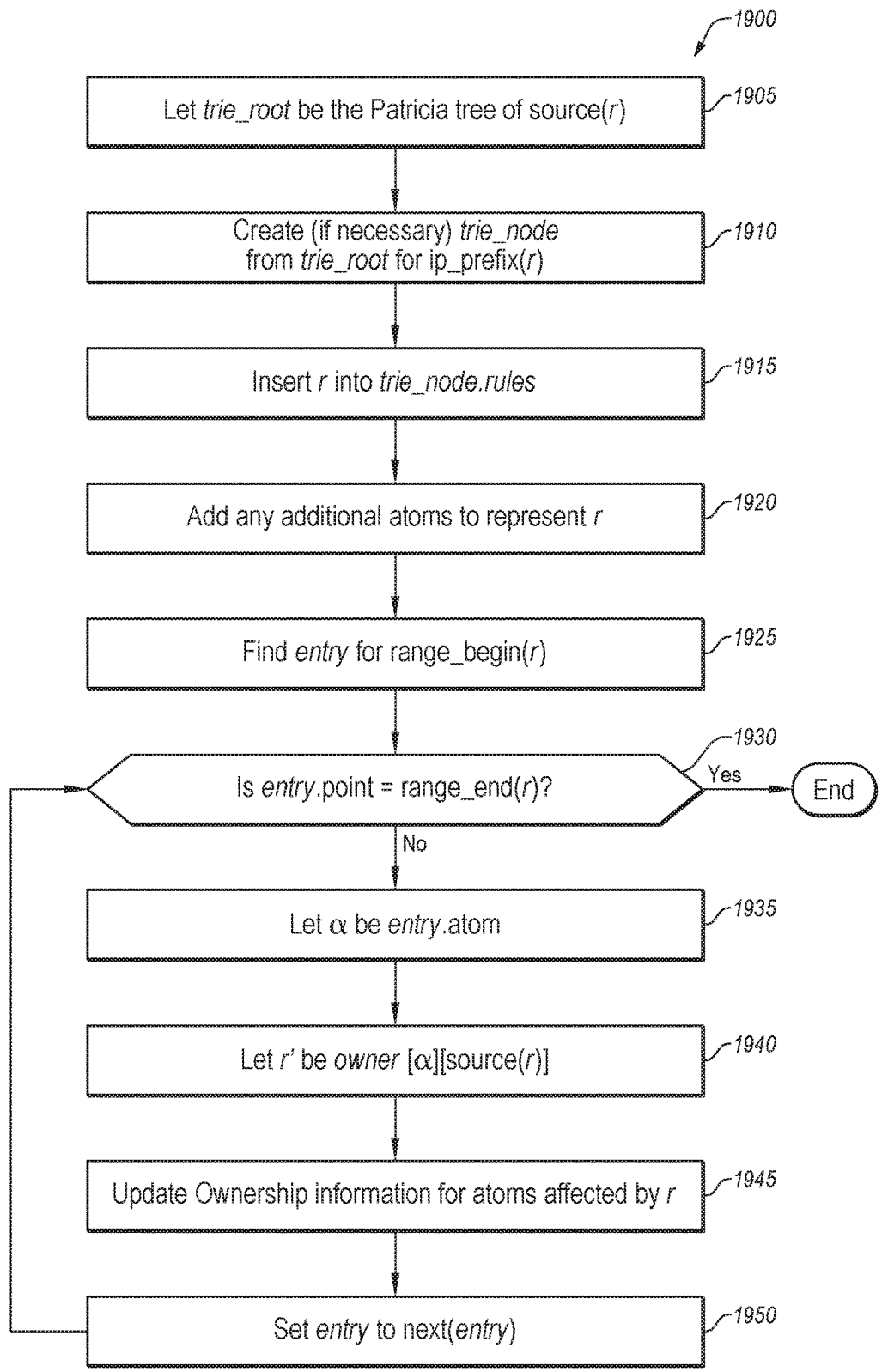
FIG. 19 illustrates a flowchart of another example method for inserting a rule in a representation.

FIG. 19 illustrates a flowchart of another example method 1900 for inserting a rule r in a representation, in accordance with one or more embodiments of the present disclosure. The method 1900 may utilize a Patricia tree representation, while the method 1000 of FIG. 10 and/or 1300 of FIG. 13 may utilize a binary tree representation. Using a Patricia tree may facilitate replacement of a stack with multiple uses of Patricia trees (e.g., once per atom). In some embodiments a Patricia tree may not be used (e.g., FIG. 14A), or may be traversed once (e.g., FIG. 14B).

At block 1905, a data structure trie_root may be identified as a Patricia tree of source(r). In some embodiments, each switch in a network may have its own Patricia tree.

At block 1910, a data structure trie_node may be created from trie_root for ip_prefix(r) if not already represented. The operator ip_prefix(r) may represent a range of addresses affected by the rule r, which may be represented by an IP prefix. Additionally, the data structure trie_node may represent a numerical starting point of an entire address range for a given rule, and may span one or more atoms and one or more rules that start at that numerical starting point (trie_node.rules).

At block 1915, the ruler may be inserted into trie_node.rules. Thus, the block 1915 may associate the newly added rule with the appropriate trie_node for the starting point of the address range for the rule r.

At block 1920, any additional atoms to represent r may be added. The block 1920 may be similar or comparable to the block 1010 of FIG. 10. One example implementation of the block 1920 may be illustrated in FIG. 11.

At block 1925, an entry for range_begin(r) may be found. The block 1925 may be similar or comparable to the block 1015 of FIG. 10.

At block 1930, a determination may be made whether entry.point (e.g., the numerical value of entry) is the same as range_end(r). The block 1930 may be similar or comparable to the block 1020 of FIG. 10. If entry.point and range_end(r) are the same, the method 1900 may proceed to end. If they are not the same, the method 1900 may proceed to block 1935.

At block 1935, the variable α may be set to entry.atom. The block 1935 may be similar or comparable to the block 1025 of FIG. 10.

At block 1940, r' may be set as owner[α][source(r)]. The block 1940 may be similar or comparable to the block 1030 of FIG. 10.

At block 1945, the ownership information may be updated for the atom α based on the newly inserted rule r. The block 1945 may be similar or comparable to the block 1040 of FIG. 10. One example of such updating may be explained with reference to FIG. 12.

At block 1950, entry may be set to next(entry). The operation 1950 may be similar or comparable to the block 1345 of FIG. 13.

Figure 20:
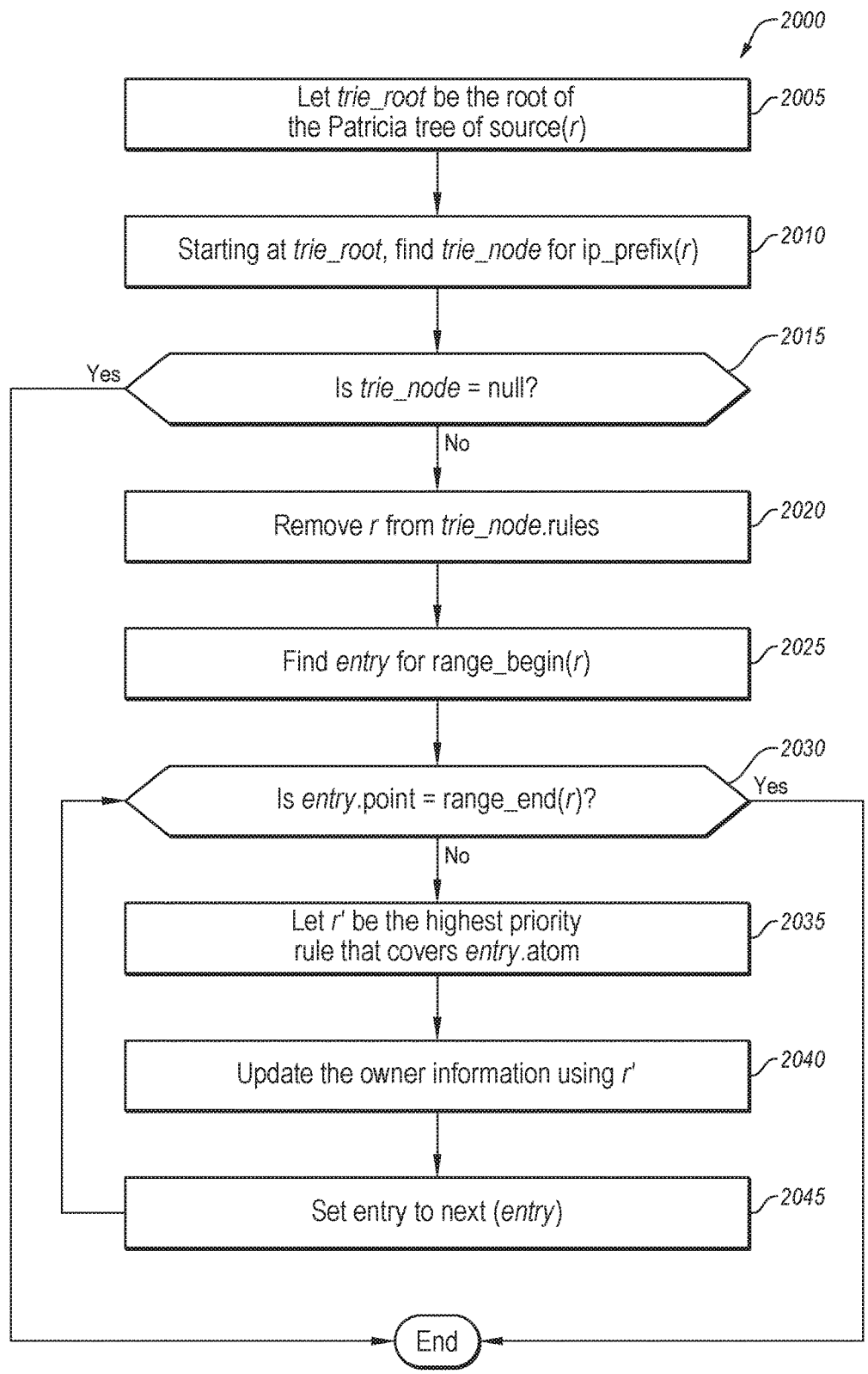
FIG. 20 illustrates a flowchart of another example method for removing a rule from a representation.

FIG. 20 illustrates a flowchart of another example method 2000 for removing a rule r from a representation, in accordance with one or more embodiments of the present disclosure. The method 2000 may utilize a Patricia tree representation, while the method 1300 of FIG. 13 may utilize a binary tree representation.

At block 2005, a data structure trie_root may be identified as a Patricia tree of source(r). The block 2010 may be similar or comparable to the block 1905 of FIG. 19.

At block 2010, starting at trie_root, the trie_node for ip_prefix(r) may be identified. For example, starting at the root of the Patricia tree, the tree may be traversed until the trie_node identifying the start of the address range for the rule r is identified.

At block 2015, a determination may be made whether trie_node is null. For example, the block 2015 may facilitate looping through blocks 2030 through 2045 to iteratively traverse the remainder of the Patricia tree. If it is determined that trie_node is null, the method 2000 may end. If it is determined that trie_node is not null, the method 2000 may proceed to block 2020.

At block 2020, the rule r may be removed from trie_node.rules.

At block 2025, the entry associated with range_begin(r) may be found.

At block 2030, a determination may be made whether entry.point is the same as range_end(r). For example, the block 2030 may determine whether atoms for the entire range of atoms within the rule r have been analyzed. If entry.point is the same as range_end(r), the method 2000 may proceed to end. If entry.point is not the same as range_end(r), the method 2000 may proceed to the block 2035.

At block 2035, the highest priority rule that covers entry.atom may be identified as the rule r'. One example approach to implementing the block 2035 may be illustrated in FIG. 21.

At block 2040, the ownership information for the atom entry.atom may be updated based on the rule r'.

At block 2045, entry may be set to next(entry). The operation 2060 may be similar or comparable to the block 1345 of FIG. 13. After block 2045, the method 2000 may return to the block 2030.

Figure 21:
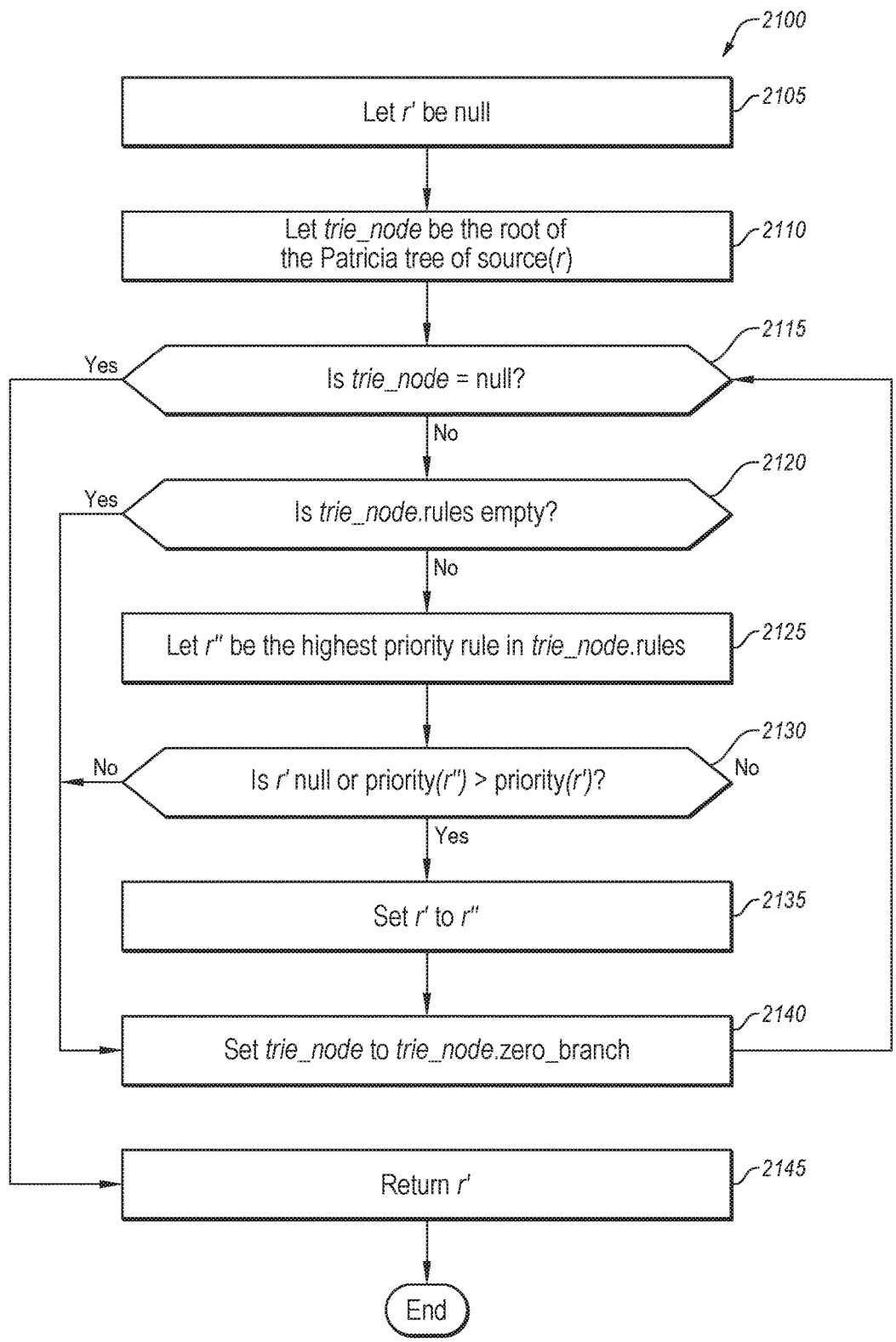
FIG. 21 illustrates a flowchart of an example method for finding a highest priority rule among rules that cover a given entry point.

FIG. 21 illustrates a flowchart of an example method 2100 for finding a highest priority rule among rules that cover a given entry point, in accordance with one or more embodiments of the present disclosure. FIG. 21 may illustrate one example implementation of the block 2050 of FIG. 120

At block 2105, the variable r' for a candidate rule may be initialized as null.

At block 2110, a data structure trie_root may be identified as a Patricia tree of source(r). The block 2110 may be similar or comparable to the block 1905 of FIG. 19.

At block 2115, a determination may be made whether trie_node is null. The operation 2115 may be similar or comparable to the block 2020 of FIG. 20.

At block 2120, a determination may be made whether trie_node.rules is empty. If it is determined that trie_node.rules is not empty, the method 2100 may proceed to the block 2125. If it is determined that trie_node.rules is empty, the method 2100 may proceed to the block 2145.

At block 2125, the highest priority rule in trie_node.rules may be identified as r".

At block 2130, a determination may be made whether r' is null or whether the priority of the rule r" is higher than the priority of the rule r'. For example, a determination may be made whether a candidate rule r' has been selected, and if that candidate rule is the highest priority rule. The block 2130 may be similar or comparable to the block 1458 of FIG. 14B. If r' is null or if the priority of r" is higher than the priority of r', the method 2100 may proceed to the block 2135. If neither condition is met, the method 2100 may proceed to the block 2140.

At block 2135, the candidate rule r' may be updated to the rule being currently analyzed, r".

At block 2140, the data structure trie_node may be set to trie_node.zero_branch. The zero_branch of the trie_node may include traversing the Patricia tree along another zero branch, or effectively lengthening the IP prefix by an additional zero (e.g., from 0.0.0.0/28 to 0.0.0.0/29). After the block 2140, the method 2100 may return to the block 2115.

Figure 22:
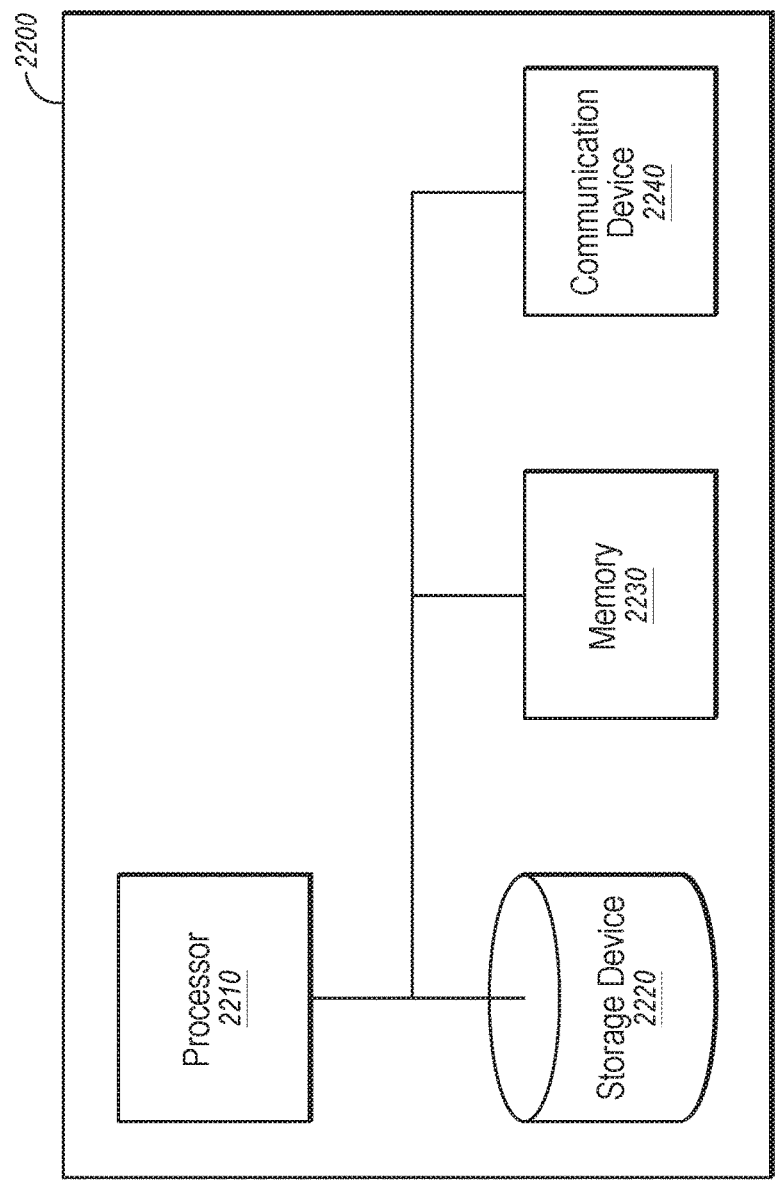
FIG. 22 is a block diagram of an example computing system.

FIG. 22 is a block diagram of an example computing system 2200, in accordance with at least one embodiment of the present disclosure. Computing system 2200 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing system 2200 may include a processor 2210, a storage device 2220, a memory 2230, and a communication device 2240. Processor 2210, storage device 2220, memory 2230, and/or communication device 2240 may all be communicatively coupled such that each of the components may communicate with the other components. Computing system 2200 may perform any of the operations described in the present disclosure.

In general, processor 2210 may include any suitable special-purpose or general-purpose computer, computing entity, or processing device including various computer hardware or software modules and may be configured to execute instructions stored on any applicable computer-readable storage media. For example, processor 2210 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 22, processor 2210 may include any number of processors configured to perform, individually or collectively, any number of operations described in the present disclosure.

In some embodiments, processor 2210 may interpret and/or execute program instructions and/or process data stored in storage device 2220, memory 2230, or storage device 2220 and memory 2230. In some embodiments, processor 2210 may fetch program instructions from storage device 2220 and load the program instructions in memory 2230. After the program instructions are loaded into memory 2230, processor 2210 may execute the program instructions.

For example, in some embodiments, one or more of the processing operations for network verification may be included in data storage 2220 as program instructions. Processor 2210 may fetch the program instructions of one or more of the processing operations and may load the program instructions of the processing operations in memory 2230. After the program instructions of the processing operations are loaded into memory 2230, processor 2210 may execute the program instructions such that computing system 2200 may implement the operations associated with the processing operations as directed by the program instructions.

Storage device 2220 and memory 2230 may include computer-readable storage media for carrying or having computer-executable instructions or data structures stored thereon. Such computer-readable storage media may include any available media that may be accessed by a general-purpose or special-purpose computer, such as processor 2210. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 2210 to perform a certain operation or group of operations.

In some embodiments, storage device 2220 and/or memory 2230 may store data associated with network verification. For example, storage device 2220 and/or memory 2230 may store properties, data planes, network applications, forwarding tables, forwarding rules, forwarding behavior representations, ownership information, and graphs (e.g., edge-labelled graphs and/or transformed edge-labelled graphs).

Communication device 2240 may include any device, system, component, or collection of components configured to allow or facilitate communication between computing system 2200 and another electronic device. For example, communication device 2240 may include, without limitation, a modem, a network card (wireless or wired), an infrared communication device, an optical communication device, a wireless communication device (such as an antenna), and/or chipset (such as a Bluetooth device, an 802.6 device (e.g., Metropolitan Area Network (MAN)), a Wi-Fi device, a WiMAX device, cellular communication facilities, etc.), and/or the like. Communication device 940 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 22 without departing from the scope of the present disclosure. For example, computing device 2200 may include more or fewer elements than those illustrated and described in the present disclosure. For example, computing system 2200 may include an integrated display device such as a screen of a tablet or mobile phone or may include an external monitor, a projector, a television, or other suitable display device that may be separate from and communicatively coupled to computing system 2200.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A network verification method, comprising:
   identifying a data plane for routing traffic through a network that includes one or more forwarding tables for each switch of a plurality of switches in the data plane;
   obtaining a forwarding behavior representation of the data plane based on the forwarding tables;
   obtaining a forwarding rule from the one or more forwarding tables after obtaining the forwarding behavior representation;
   transforming the forwarding behavior representation based on the forwarding rule by modifying a portion of the forwarding behavior representation affected by the forwarding rule without generating an entirely new representation;
   pruning meta-information about the forwarding rule that is redundant to forwarding behavior; and
   comparing the forwarding behavior representation of the data plane to one or more network properties of expected behavior of the data plane to detect one or more errors in the data plane as variations from the expected behavior.

2. The method of claim 1, wherein obtaining a forwarding behavior representation of the data plane includes:
   obtaining one or more forwarding rules from the forwarding tables; and
   generating the forwarding behavior representation based on the one or more forwarding rules.

3. The method of claim 2, wherein generating the forwarding behavior representation includes storing a set of beginning address values for the one or more forwarding rules and an associated priority-ordered list of forwarding rules associated with each of the beginning address values.

4. The method of claim 3, wherein transforming the forwarding behavior representation includes:
   determining whether an address range associated with the forwarding rule matches an existing atom;
   generating additional atoms until the address range associated with the forwarding rule is completely covered by pre-existing atoms, the additional atoms, or both; and
   updating ownership information of one or more atoms based on the forwarding rule and the additional atoms.

5. The method of claim 1, wherein transforming the forwarding behavior representation includes storing ownership information of an atom, the atom including a numerical range of network addresses, and the ownership information of the atom being indicative of a given forwarding rule designated as an owner of the atom, the given forwarding rule being designated as the owner of the atom based on the given forwarding rule being a highest priority forwarding rule for the atom governing forwarding behavior with respect to the numerical range of network addresses of the atom for a given switch.

6. The method of claim 5, wherein pruning meta-information includes pruning other potential owning rules with a lower priority than the given forwarding rule identified in the ownership information.

7. The method of claim 1, further comprising:
   removing a second forwarding rule from the forwarding behavior representation; and
   reconstructing particular meta-information associated with the second forwarding rule to determine additional forwarding behavior modifications based on removal of the second forwarding rule.

8. The method of claim 7, wherein reconstructing the particular meta-information includes determining new ownership information of one or more atoms affected by the second forwarding rule, the new ownership information includes a next highest priority rule after the second forwarding rule.

9. The method of claim 8, wherein the forwarding rule affects an Internet Protocol (IP) prefix.

10. The method of claim 1, wherein transforming the forwarding behavior representation of the data plane comprises generating an edge-labelled graph, wherein each edge of the edge-labelled graph is associated with one or more atoms, each atom representing a distinct address range and the forwarding rule is associated with one or more atoms covering a range of addresses affected by a given forwarding rule.

11. One or more non-transitory computer-readable media that include instructions that, in response to being executed by one or more processors, are configured to cause a system to perform operations, the operations comprising:
   identifying a data plane for routing traffic through a network that includes one or more forwarding tables for each switch of a plurality of switches in the data plane;
   obtaining a forwarding behavior representation of the data plane based on the forwarding tables;
   obtaining a forwarding rule from the one or more forwarding tables after obtaining the forwarding behavior representation;
   transforming the forwarding behavior representation based on the forwarding rule by modifying a portion of the forwarding behavior representation affected by the forwarding rule without generating an entirely new representation;
   pruning meta-information about the forwarding rule that is redundant to forwarding behavior; and
   comparing the forwarding behavior representation of the data plane to one or more network properties of expected behavior of the data plane to detect one or more errors in the data plane as variations from the expected behavior.

12. The computer-readable media of claim 11, wherein obtaining a forwarding behavior representation of the data plane includes:
   obtaining one or more forwarding rules from the forwarding tables; and
   generating the forwarding behavior representation based on the one or more forwarding rules.

13. The computer-readable media of claim 12, wherein generating the forwarding behavior representation includes storing a set of beginning address values for the one or more forwarding rules and an associated priority-ordered list of forwarding rules associated with each of the beginning address values.

14. The computer-readable media of claim 11, wherein transforming the forwarding behavior representation includes storing ownership information of an atom, the atom including a numerical range of network addresses, and the ownership information of the atom being indicative of a given forwarding rule designated as an owner of the atom, the given forwarding rule being designated as the owner of the atom based on the given forwarding rule being a highest priority forwarding rule for the atom governing forwarding behavior with respect to the numerical range of network addresses of the atom for a given switch.

15. The computer-readable media of claim 14, wherein pruning meta-information includes pruning other potential owning rules with a lower priority than the given forwarding rule identified in the ownership information.

16. The computer-readable media of claim 11, transforming the forwarding behavior representation includes additional operations comprising:
   determining whether an address range associated with the forwarding rule matches an existing atom;
   generating additional atoms until the address range associated with the forwarding rule is completely covered by pre-existing atoms, the additional atoms, or both; and
   updating ownership information of one or more atoms based on the forwarding rule and the additional atoms.

17. The computer-readable media of claim 11, the operations further comprising
   removing a second forwarding rule from the forwarding behavior representation; and
   reconstructing particular meta-information associated with the second forwarding rule to determine additional forwarding behavior modifications based on removal of the second forwarding rule.

18. The computer-readable media of claim 17, wherein reconstructing the particular meta-information includes determining new ownership information of one or more atoms affected by the second forwarding rule, the new ownership information includes a next highest priority rule after the second forwarding rule.

19. A network verification system, comprising:
   one or more processors; and
   one or more non-transitory computer-readable media that include instructions that, when executed by the one or more processors, are configured to cause the network verification system to perform operations, the operations comprising:
      identifying a data plane for routing traffic through a network that includes one or more forwarding tables for each switch of a plurality of switches in the data plane;
      obtaining a forwarding behavior representation of the data plane based on the forwarding tables;
      obtaining a forwarding rule from the one or more forwarding tables after obtaining the forwarding behavior representation;
      transforming the forwarding behavior representation based on the forwarding rule by modifying a portion of the forwarding behavior representation affected by the forwarding rule without generating an entirely new representation;
      pruning meta-information about the forwarding rule that is redundant to forwarding behavior; and
      comparing the forwarding behavior representation of the data plane to one or more network properties of expected behavior of the data plane to detect one or more errors in the data plane as variations from the expected behavior.

20. The system of claim 19, wherein transforming the forwarding behavior representation includes storing ownership information of an atom, the atom including a numerical range of network addresses, and the ownership information of the atom being indicative of a given forwarding rule designated as an owner of the atom, the given forwarding rule being designated as the owner of the atom based on the given forwarding rule being a highest priority forwarding rule for the atom governing forwarding behavior with respect to the numerical range of network addresses of the atom for a given switch.

* * * * *